US012377943B2

(12) United States Patent
Engeberg

(10) Patent No.: US 12,377,943 B2
(45) Date of Patent: Aug. 5, 2025

(54) APPARATUS AND METHOD FOR A FREE-SWIMMING SOFT UNDERWATER ROBOT USING ADAPTIVE THREE-AXIS DEPTH CONTROL TO MONITOR MARINE ENVIRONMENTS

(71) Applicant: FLORIDA ATLANTIC UNIVERSITY BOARD OF TRUSTEES, Boca Raton, FL (US)

(72) Inventor: Erik Engeberg, Boca Raton, FL (US)

(73) Assignee: FLORIDA ATLANTIC UNIVERSITY BOARD OF TRUSTEES, Boca Raton, FL (US)

( * ) Notice: Subject to any disclaimer, the term of this patent is extended or adjusted under 35 U.S.C. 154(b) by 322 days.

(21) Appl. No.: 18/010,703

(22) PCT Filed: Jun. 16, 2021

(86) PCT No.: PCT/US2021/037562
§ 371 (c)(1),
(2) Date: Dec. 15, 2022

(87) PCT Pub. No.: WO2021/257657
PCT Pub. Date: Dec. 23, 2021

(65) Prior Publication Data
US 2023/0264794 A1 Aug. 24, 2023

Related U.S. Application Data

(60) Provisional application No. 63/041,178, filed on Jun. 19, 2020.

(51) Int. Cl.
*B63G 8/00* (2006.01)
*A01K 29/00* (2006.01)
(Continued)

(52) U.S. Cl.
CPC .............. *B63G 8/001* (2013.01); *A01K 29/00* (2013.01); *B63G 8/08* (2013.01); *B63G 8/16* (2013.01); *B63G 2008/005* (2013.01)

(58) Field of Classification Search
CPC .... B63G 8/001; B63G 8/16; B63G 2008/005; B63B 2211/02
See application file for complete search history.

(56) References Cited

U.S. PATENT DOCUMENTS 6,119,630 A 9/2000 Lobsiger et al.
6,525,762 B1 * 2/2003 Mileski .................. H04N 7/005
455/66.1
(Continued)

OTHER PUBLICATIONS

Tyler Berrigan; This robotic jellyfish is a climate spy; Dec. 18, 2018.*
(Continued)

*Primary Examiner* — Peter D Nolan
*Assistant Examiner* — Anwar Mohamed
(74) *Attorney, Agent, or Firm* — Meunier Carlin & Curfman LLC

(57) ABSTRACT

An underwater robot apparatus that is capable of omnidirectional lateral movement using Bluetooth, depth, temperature, and light sensors for monitoring the marine environment. The apparatus is an adaptive, three-axis control soft robotic apparatus embedded with sensors and can swim in three dimensions to record aquatic life. An adaptive controller within the soft robotic apparatus produces positive upward motion despite its negative buoyancy and additional pressure vessel mass. A submersible impellor pump is connected to each actuator grouping wherein propulsion is created by filling and emptying of nine tentacles with surrounding ambient water. The apparatus produces maximum thrust using a full stroke actuation scheme at a frequency of 0.3 Hz. In addition to upward motion, the appa-
(Continued)

ratus effects lateral motion utilizing two of three sets of actuator groups for more complex travel. An onboard pressure sensor coupled with the adaptive controller, allows the apparatus to autonomously hold to a predetermined depth.

21 Claims, 16 Drawing Sheets

(51) Int. Cl.
  *B63G 8/08* (2006.01)
  *B63G 8/16* (2006.01)

(56) References Cited

U.S. PATENT DOCUMENTS

| | | | |
|---|---|---|---|
| 6,699,535 B2* | 3/2004 | Boschert | A01K 61/70 446/153 |
| 2010/0005857 A1 | 1/2010 | Zhang et al. | |
| 2014/0224167 A1 | 8/2014 | Gasparoni et al. | |
| 2018/0015991 A1* | 1/2018 | Tan | B63G 8/001 |
| 2019/0344452 A1* | 11/2019 | Trigui | B08B 9/023 |
| 2024/0427372 A1* | 12/2024 | Gillen | G06F 1/12 |

OTHER PUBLICATIONS

International Search Report and Written Opinion issued in PCT/US2021/037562, mailed Sep. 17, 2021, 11 Pages.
Berrigan, This robotic jellyfish is a climate spy, Science News for Students, retrieved from <URL: http://www.sciencenewforstudents.org/article/robotic-jellyfish-climate-spy> Dec. 2018, 4 Pages.
Behbahani SB, Tan X. Bio-inspired flexible joints with passive feathering for robotic fish pectoral fins. Bioinspiration & biomimetics. 2016;11(3):036009.
Bressers S, Chung S, Villanueva A, et al. JetSum: SMA actuator based undersea unmanned vehicle inspired by jellyfish biomechanics. Behavior and Mechanics of Multifunctional Materials and Composites 2010. International Society for Optics and Photonics; 2010; 76440G.
Dudek G, Jenkin M, Prahacs C, et al. A visually guided swimming robot. 2005 IEEE/RSJ International Conference on Intelligent Robots and Systems. IEEE; 2005; 3604-9.
Felemban E, Shaikh FK, Qureshi UM, et al. Underwater sensor network applications: A comprehensive survey. International Journal of Distributed Sensor Networks. 2015;11(11):896832.
Frame J, Lopez N, Curet O, et al. Thrust force characterization of free-swimming soft robotic jellyfish. Bioinspiration & biomimetics. 2018;13(6):064001.
Gao T, Hu HH. Deformation of elastic particles in viscous shear flow. Journal of Computational Physics. 2009;228(6):2132-51.
Guo S, Ge Y, Li L, et al. Underwater swimming micro robot using IPMC actuator. 2006 International Conference on Mechatronics and Automation. IEEE; 2006; 249-54.
Guo S, Shi L, Asaka K. IPMC actuator-based an underwater microrobot with 8 legs. 2008 IEEE International Conference on Mechatronics and Automation. IEEE; 2008; 551-6.
Hess AM. Simulation and Design of Soft Robotic Swimmers with Artificial Muscle: Michigan State University; 2019.
Hoover AP, Griffith BE, Miller LA. Quantifying performance in the medusan mechanospace with an actively swimming three-dimensional jellyfish model. Journal of Fluid Mechanics. 2017;813:1112-55.
Hu HH, Patankar NA, Zhu M. Direct numerical simulations of fluid-solid systems using the arbitrary Lagrangian-Eulerian technique. Journal of Computational Physics. 2001;169(2):427-62.
Jokiel PL, Brown EK, Friedlander A, et al. Hawai'i coral reef assessment and monitoring program: spatial patterns and temporal dynamics in reef coral communities. Pacific Science. 2004;58(2):159-74.

Katzschmann RK, DelPreto J, MacCurdy R, et al. Exploration of underwater life with an acoustically controlled soft robotic fish. Science Robotics. 2018;3(16):eaar3449.
Kawabata K, Takemura F, Suzuki T, et al. Underwater image gathering by utilizing stationary and movable sensor nodes: towards observation of symbiosis system in the coral reef of Okinawa. International Journal of Distributed Sensor Networks. 2014;10(7):835642.
Lighthill M. Note on the swimming of slender fish. Journal of fluid Mechanics. 1960;9(2):305-17.
Lin Z, Hess A, Yu Z, et al. A fluid-structure interaction study of soft robotic swimmer using a fictitious domain/active-strain method. Journal of Computational Physics. 2019;376:1138-55.
Lucas CH. Reproduction and life history strategies of the common jellyfish, *Aurelia aurita*, in relation to its ambient environment. Jellyfish Blooms: Ecological and Societal Importance. Springer; 2001. p. 229-46.
Marut K, Stewart C, Michael T, et al. A jellyfish-inspired jet propulsion robot actuated by an iris mechanism. Smart Materials and Structures. 2013;22(9):094021.
McHenry MJ, Jed J. The ontogenetic scaling of hydrodynamics and swimming performance in jellyfish (*Aurelia aurita*). Journal of Experimental Biology. 2003;206(22):4125-37.
Moberg F, Folke C. Ecological goods and services of coral reef ecosystems. Ecological economics. 1999;29(2):215-33.
Najem J, Akle B, Sarles SA, et al. Design and development of a biomimetic jellyfish robot that features ionic polymer metal composites actuators. ASME 2011 Conference on Smart Materials, Adaptive Structures and Intelligent Systems. American Society of Mechanical Engineers Digital Collection; 2011; 691-8.
Nawroth JC, Lee H, Feinberg AW, et al. A tissue-engineered jellyfish with biomimetic propulsion. Nature biotechnology. 2012;30(8):792-7.
Neveln ID, Bai Y, Snyder JB, et al. Biomimetic and bio-inspired robotics in electric fish research. Journal of experimental Biology. 2013;216(13):2501-14.
Niu C, Zhang L, Bi S, et al. Development and depth control of a robotic fish mimicking cownose ray. 2012 IEEE International Conference on Robotics and Biomimetics (ROBIO). IEEE; 2012; 814-8.
Purcell EM. Life at low Reynolds number. American journal of physics. 1977;45(1):3-11.
Salazar R, Campos A, Fuentes V, et al. A review on the modeling, materials, and actuators of aquatic unmanned vehicles. Ocean Engineering. 2019; 172:257-85.
Scavia D, Field JC, Boesch DF, et al. Climate change impacts on US coastal and marine ecosystems. Estuaries. 2002;25(2):149-64.
Schoepf V, Stat M, Falter JL, et al. Limits to the thermal tolerance of corals adapted to a highly fluctuating, naturally extreme temperature environment. Scientific reports. 2015;5(1):1-14.
Sfakiotakis M, Lane DM, Davies JBC. Review of fish swimming modes for aquatic locomotion. IEEE Journal of oceanic engineering. 1999;24(2):237-52.
Suzuki T, Kato K, Makihara E, et al. Development of underwater monitoring wireless sensor network to support coral reef observation. International Journal of Distributed sensor networks. 2014;10(4):189643.
Suzumori K, Endo S, Kanda T, et al. A bending pneumatic rubber actuator realizing soft-bodied manta swimming robot. Proceedings 2007 IEEE International Conference on Robotics and Automation. IEEE; 2007; 4975-80.
Villanueva A, Smith C, Priya S. A biomimetic robotic jellyfish (Robojelly) actuated by shape memory alloy composite actuators. Bioinspiration & biomimetics. 2011;6(3):036004.
Weston J, Colin SP, Costello JH, et al. Changing form and function during development in rowing hydromedusae. Marine Ecology Progress Series. 2009;374:127-34.
Xu NW, Dabiri JO. Low-power microelectronics embedded in live jellyfish enhance propulsion. Science Advances. 2020;6(5):eaaz3194.
Ye XF, Hu YN, Guo SX, et al. Driving mechanism of a new jellyfish-like microrobot. 2008 IEEE International Conference on Mechatronics and Automation. IEEE; 2008; 563-8.

(56) References Cited

OTHER PUBLICATIONS

Zhou C, Low K. Design and locomotion control of a biomimetic underwater vehicle with fin propulsion. IEEE/ASME Transactions on Mechatronics. 2011;17(1):25-35.

* cited by examiner

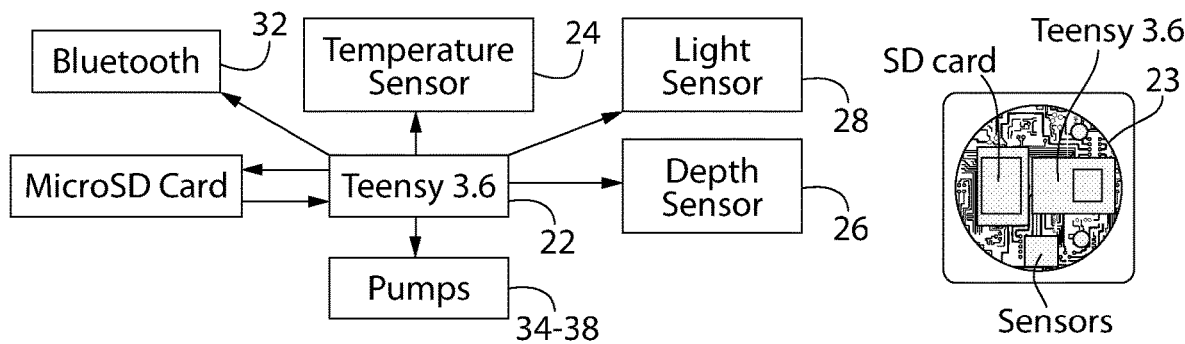
FIG. 8A          FIG. 8B
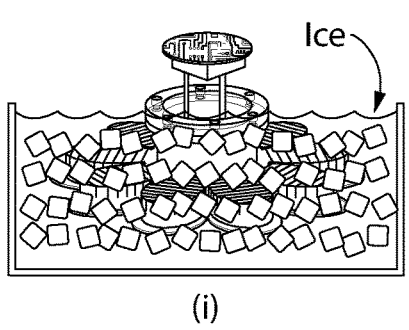 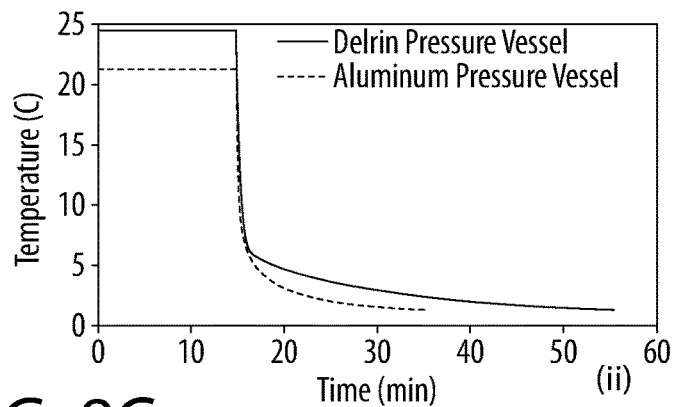
FIG. 8C
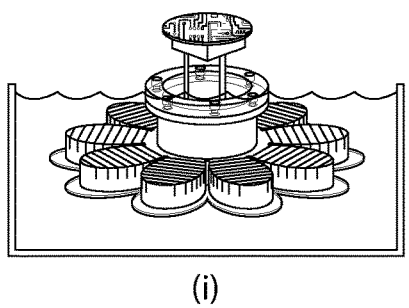 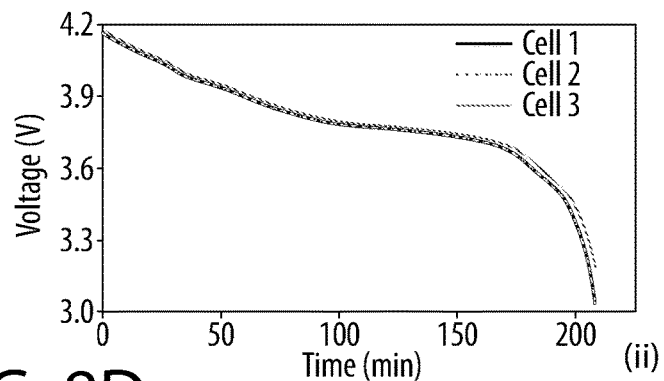
FIG. 8D
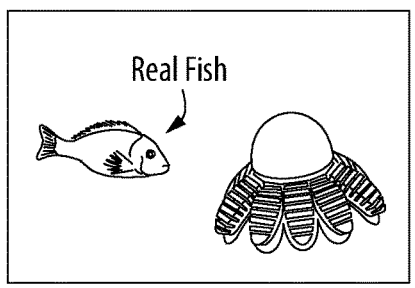 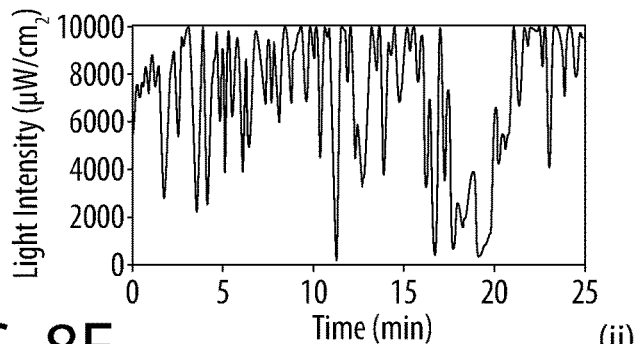
FIG. 8E

APPARATUS AND METHOD FOR A FREE-SWIMMING SOFT UNDERWATER ROBOT USING ADAPTIVE THREE-AXIS DEPTH CONTROL TO MONITOR MARINE ENVIRONMENTS

CROSS-REFERENCE TO RELATED APPLICATIONS

This application is a U.S. National Phase entry under 35 U.S.C. § 371 of International Application No. PCT/US2021/037562, filed Jun. 16, 2021, which claims the benefit under 35 U.S.C. § 119 (e) of Application Ser. No. 63/041,178 filed on Jun. 19, 2020, entitled APPARATUS AND METHOD FOR A FREE-SWIMMING SOFT ROBOTIC JELLYFISH USING ADAPTIVE THREE-AXIS DEPTH CONTROL TO MONITOR MARINE ENVIRONMENT, and whose entire disclosure is incorporated by reference herein.

BACKGROUND OF THE INVENTION

The present invention is related generally to a robotic underwater monitoring device and more particularly to a biomimetic apparatus that is capable of omnidirectional lateral and upward thrust movement using Bluetooth, depth, temperature, and light sensors for monitoring the marine environment.

Coral reefs are an invaluable resource for mankind, producing nourishment, coastal protection in addition to the recreational activities and beauty they bring to the coastal regions. While only covering an estimated 0.1 to 0.5 percent of the ocean floor, they are home to roughly a third of the ocean's marine fish population[1]. The damage induced by these stressors are not necessarily permanent or deadly, chronically stressed coral reefs that occur severe damage rarely recover[2]. As is seen in FIG. 1d, the coral reef was damaged, and only a few remain in the Florida Key Largo area. Therefore, it is imperative that humanity better understand and monitor the delicate balance and needs of the coral reef ecosystems, to help alleviate the stresses and damage that humankind is inflicting on this vital resource.

To monitor marine environments, many methods have begun to develop from the rapid decline of coral reefs all over the world. In Hawaii, the Coral Reef Assessment and Monitoring Program (CRAMP) is using diver-supported video equipment to map large areas of coral reef to monitor the growth or decay of reef systems[3]. CRAMP uses the visual data collected to compare reef regeneration after storms and how the coral ecosystem is changing with time. However, the video equipment is quite big and expensive and which is difficult for use in most areas in the world. No sensors are used in the equipment. Off the coast of Japan, there is an Underwater Monitoring Wireless Sensor Network being deployed to sense ambient temperature and collect visual data from a series of stationary nodes dispersed among coral reefs[4, 5]. The sensor network utilizes buoys that allow the sensor network to wirelessly transfer the data acquired as well as remotely-controlling a mobile sensor node[6]. GPS buoys, coupled with satellite imaging from IKONOS and the Landsat program (both being commercial Earth observation satellites), are being utilized to monitor the location and size of reefs in multiple countries[7, 8]. After extreme bleaching events occurred worldwide, side-scan sonar arrays were used to survey the Ste. Anne and Curjeuse Marine National Parks in the Seychelles Islands [9]. Sonar imagery was taken twice, once six months after the bleaching event occurred in the area and thirty months after, which allowed a comparison to see the recovery of continual degradation of the coral reef systems[9]. Robert, etc. explored the underwater life with an acoustically controlled soft robotic fish[10]. However, currently, there is no robot system combined with Bluetooth, depth, temperature, and a light sensor.

Inspiration for many types of robotics and vehicles are derived from biological mechanisms that already exist in nature. Organisms that have had millennia to evolve and fine-tune, display creative and efficient ways to complete a variety of tasks. Scientists and engineers seek to replicate the success seen in nature to complete missions and solve real-world problems by designing robots that mimic biology. By looking toward nature, strides have been made to move away from inefficient propeller-based propulsion and move toward locomotion that has been tested and tempered by millions of years of development. The field of soft robotics have made great advances using biomimicry, such as creating soft robotic gloves to enable stroke victims to regain movement affected by their condition[11], creating soft robotic manipulators based on octopus tentacles to give a wide variety of gripping options while still being capable of supporting heavy loads[12]. There are also several robotic vehicles capable of swimming, employing locomotion methods found in nature[13]. The undulating locomotion of a manta ray was mimicked with an assortment of actuation methods[14, 15]. A multitude of fish species have had their swimming mechanics, and characteristics studied and replicated through various means of actuation [16-19].

The biomechanics of jellyfish are valued in the scientific and engineering community because of the highly efficient nature of their swimming characteristics. Due to this fact, many research projects have been implemented in attempts to replicate the fuel-efficient movement of many different species of jellyfish. These robotic jellyfish have utilized a plethora of actuator styles such as Shape Memory Alloys (SMA) that when the heat is applied to the actuator, it contracts and propels the robot through the water[20, 21]. Another means of actuation applied are Ionic Polymer Metal Composites (IPMC) actuators that have a resting position, but when under-voltage, deform, and flex replicating muscle behavior[22-24]. Tissue-engineered material was created from rat cardiac tissue and coupled with a pacemaker to stimulate actual muscle fibers, generating jellyfish style undulation[25].

There are two major jellyfish locomotion styles modeled in the process of duplicating jellyfish-like vehicles, rowing, and jetting. Jetting uses the contraction of a bell to rapidly change the volume of the bell, forcing the water out of the bell in the opposite direction of desired travel. The *Aurelia aurita* jellyfish employs this jetting technique and has shown that there is a correlation between bell shape and size to the velocity ant, which it can travel[26]. Researchers at Virginia Tech designed a contraction method for jetting locomotion based on the mechanics of an iris driven by a set of spur gears and small DC motor[27]. Another means of jet-propelled contractions were replicated with the use of SMA wires in the JetSum robotic jellyfish[20]. The second means of jellyfish propulsion, rowing, can be seen in nature utilized by the *A. victoria* jellyfish species[28]. The larger jellyfish species, especially in the latter stages of their life cycle, depend on rowing over jetting as a means of propulsion[28]. The rowing locomotion has been duplicated by the robojelly by exploiting IPMC actuators to paddle the vehicle through the water[24]. The same department that created robojelly also produced another rowing-based jellyfish named Cryo, which utilizes a linkage system driven by linear actuators and weighs roughly 170 pounds. While the research shows, the jetting locomotion produces proficient swimming, the rowing locomotion is more efficient[29].

In the past decades, finite element analysis has been developed to simulate interactions between fluid and moving elastic objects[30, 31]. Designing soft swimming robots that undergo active deformations in a fluid is considerably challenging. First of all, fast-swimming motions are typically result from a significant amount of momentum exchange between the fluid and solid structures to overcome viscous drag force in the fluid, which require robots to generate rapid and stable structural deformations reversibly. Meanwhile, efficient locomotion of a deformable object requires the employment of specific swimming patterns (or swimming gaits) to take advantage of thrust forces from the resultant fluid drag and wake structures behind[32], which is critical especially in the small or finite Reynolds number regime where the viscous effect is important[33]. To take all the factors into account, the dynamical performances of soft robots with various geometries, material properties, as well as the imposed active control schemes, need to be determined jointly with the induced fluid motions. In general, while various types of soft robots have been manufactured and tested, it is desired to understand their precise swimming mechanisms, which require the combination of experimental studies with accurate modeling and simulations in design, analysis, and optimization.

A soft robotic jellyfish [34] was developed and tested by the same Assignee, namely, Florida Atlantic University, as the present invention that was able to freely swim untethered in the ocean and which could steer from side to side and to swim through orifices narrower than the nominal diameter of the robotic jellyfish. However, in that configuration only planar movement was achieved using two submersible pumps, one pump controlling a group of four tentacles; as such, a total of eight tentacles (as occurs in nature) was used in that soft robotic jellyfish.

Thus, there remains a need for a free-swimming soft robotic jellyfish that achieves omnidirectional movement, namely, lateral movement as well as upward driven motion. The present invention solves this problem.

All references cited herein are incorporated herein by reference in their entireties.

BRIEF SUMMARY OF THE INVENTION

An underwater robot apparatus that can freely swim in three dimensions for monitoring underwater marine life in a marine environment is disclosed. The apparatus comprises: a body portion having a plurality (e.g., nine) of soft actuators that can articulate to maneuver and propel the apparatus; a plurality of submersible pumps (e.g., three submersible pumps) within the body portion, each one of the plurality of submersible pumps controlling the activation of particular ones (e.g., three) of the plurality of soft actuators; a pressure sensor for detecting the pressure of the ambient marine environment corresponding to depth in the marine environment; an adaptive controller coupled to each one of the submersible pumps for commanding the plurality of submersible pumps to undulate the particular ones of the plurality of soft actuators at an undulation frequency; the pressure sensor coupled to the adaptive controller for providing feedback to form a depth tracking error and wherein the adaptive controller modulates the undulation frequency based on the depth tracking error to achieve omnidirectional movement (e.g., three-dimensional movement) of the apparatus within the marine environment.

A method for forming an underwater robot apparatus that can freely swim in three dimensions for monitoring underwater marine life in a marine environment is disclosed. The method comprises: providing a body portion having a plurality of soft actuators (e.g., nine) that can articulate to maneuver and propel the apparatus; coupling a plurality of submersible pumps (e.g., three submersible pumps) to respective ones (e.g., three) of the plurality of soft actuators, such that each of one of the submersible pumps activates the respective ones of the plurality of soft actuators; coupling an adaptive controller to each one of the submersible pumps for commanding the plurality of submersible pumps to undulate the particular ones of the plurality of soft actuators; coupling a pressure sensor to the adaptive controller for detecting the pressure of the ambient marine environment corresponding to depth in the marine environment and providing feedback to the adaptive controller to form a depth tracking error; and wherein the adaptive controller modulates the undulation frequency based on the depth tracking error to achieve omnidirectional movement (e.g., three-dimensional movement) of the apparatus within said marine environment.

A robotic apparatus that can maneuver or assume different postures in a dark underwater marine environment is disclosed. The apparatus comprises: a body portion having at least one soft actuator that can articulate to pose, or maneuver or propel the apparatus, wherein the at least one soft actuator comprises a phosphorescent, luminescent or glowing material which can illuminate the dark underwater marine environment following exposure of the phosphorescent, luminescent or glowing material to light; at least one driver within the body portion, wherein the at least one driver controls the activation of the at least one soft actuator; a controller coupled to the at least one driver for commanding the at least one driver to undulate the at least one soft actuator to maneuver or propel or pose the apparatus within the marine environment.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A(ii) depicts three actuation schemes where F means full stroke actuation, H1 means half stroke actuation 1 and H2 means half stroke actuation;

FIG. 5B(ii) depicts a plot of the pump voltage vs. time;

FIG. 5C(ii) depicts a plot of the pump activity vs. time for the adaptive controller;

FIG. 5D(ii) depicts a plot of the pump activity vs. time for the bang-bang controller;

FIG. 8A is a block diagram of the electronics of the present application;

FIG. 8B depicts the physical board showing the temperature and light sensors embedded in the present invention;

FIG. 8C(i) depicts placing the present invention in an ice bath following the present invention being placed in a body of water at room temperature for 15 minutes;

FIG. 8C(ii) is the temperature response with the time between the aluminum pressure vessel system and the Delrin pressure vessel;

FIG. 8D(i) depicts the test set up for measuring battery voltages and pump activity on an oscilloscope;

FIG. 8D(ii) depicts the voltage drain on each cell of the LiPo battery during the test;

FIG. 8E(i) depicts real fish versus jellyfish; and

FIG. 8E(ii) depicts a plot of light intensities with time.

DETAILED DESCRIPTION OF THE PREFERRED EMBODIMENTS

Figure 1:
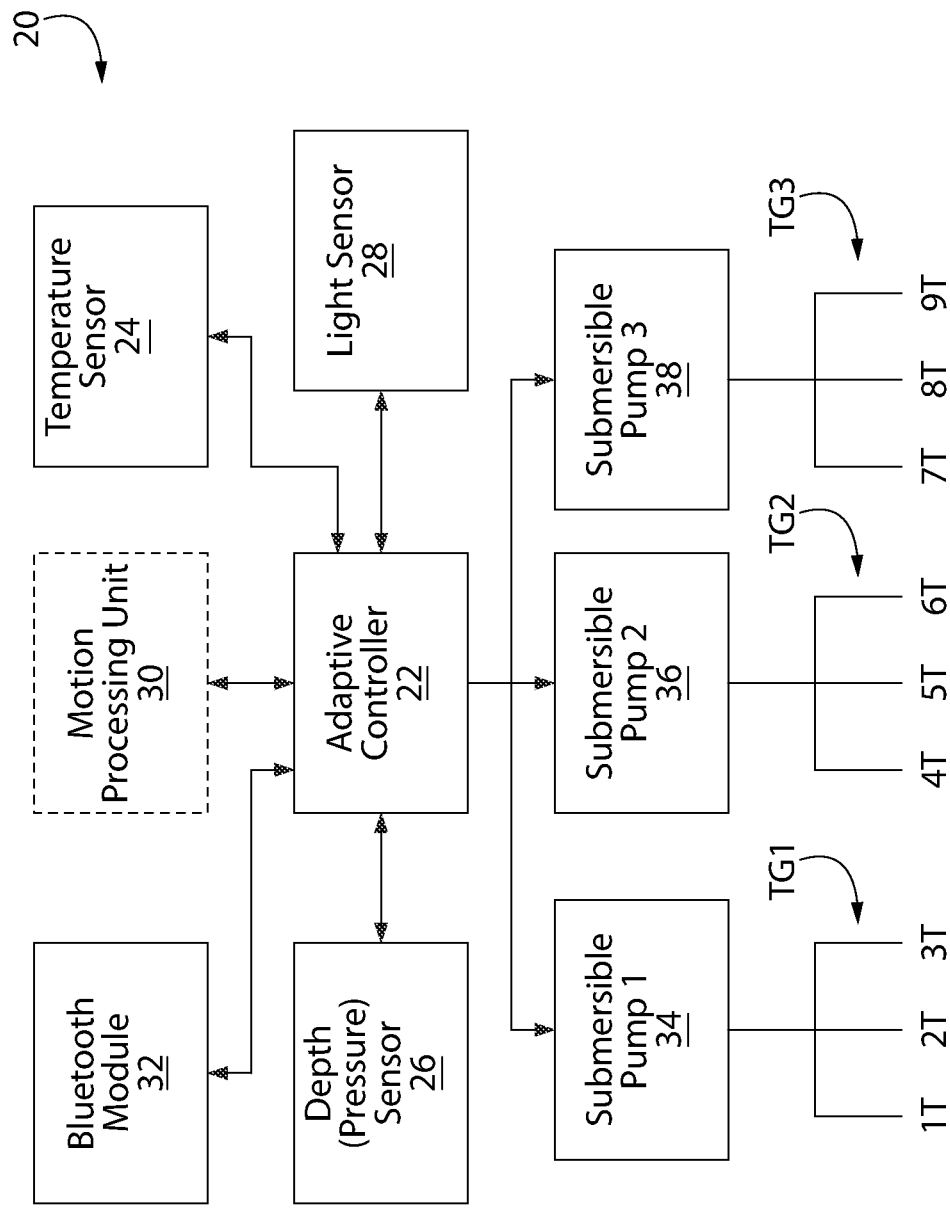
FIG. 1 is a block diagram of the underwater robot apparatus (also referred to as a "jellyfish apparatus") of the present invention.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

As shown in FIG. 1, the apparatus 20 for a free-swimming soft robotic jellyfish using adaptive three-axis depth control for monitoring marine environments comprises an adaptive controller 22 (e.g., a microcontroller such as Teensy 3.2, etc.), a temperature sensor 24 (e.g., MCP9701A, etc.), a depth sensor 26 (viz., pressure sensor, e.g., 85-100-4R), a light sensor 28 (e.g., ISL 29125 RGB), a wireless transmission module 32 (e.g., Bluetooth module, such as Xbee/Xbee Pro Zigbee RF module), three drivers 34/36/38 (e.g., submersible pumps, etc.) that each control a respective tentacle group TG1, TG2 and TG3, comprised of three tentacles each: 1T-3T in TG1, 4T-6T in TG2 and 7T-9T in TG3.

It should be noted that a motion processing unit 30 (e.g., MPU-9250-9 axis motion tracking unit) is provided on the jellyfish apparatus 20 but is not necessary for operation.

The key features of present invention 20 is the use of the adaptive controller 22, the geometry of using nine tentacles 1T-9T (also referred to as "soft actuators") which do not occur in nature and the implementation of three-dimensional control of the jellyfish apparatus 20 beyond just planar movement. Applicant wishes to emphasize that typical marine life such as octopus or jellyfish utilize eight tentacles or appendages but never nine tentacles.

As is discussed in detail later, when activated by the adaptive controller 22, the submersible pumps 34/36/38 undulate respective ones of the plurality of soft actuators 1T-9T at an undulation frequency. Furthermore, the pressure sensor 26 detects the pressure of the ambient marine environment corresponding to depth in the marine environment. This depth information is feedback to the adaptive controller 22 to form a depth tracking error. The adaptive controller 22 nonlinearly modulates the undulation frequency based on the depth tracking error to achieve omnidirectional movement of the apparatus 20 within the marine environment. This includes generating upside-down motion, rotation and for effecting vertical and horizontal swimming.

The soft robotic jellyfish 20 (also referred to as "vehicle" in some parts of this Specification) was developed to enable omnidirectional lateral movement as well as upward driven motion with minimal potential to damage delicate coral during reef health monitoring operations (FIGS. 2A-2D). The new jellyfish was outfitted with remote connectivity, depth, temperature, and light sensors were embedded in this platform. As mentioned above, the soft jellyfish robot 20 comprises nine powerful hydraulic soft actuators that are controlled by three pumps 34, 36 and 38 (three tentacles per pump) to enable omnidirectional motion control (FIGS. 2A-2D). Three different actuation schemes were tested on the inline load cell, as well as a range of frequencies for each actuation scheme. Actuation frequency and amplitude impacts thrust force were determined. To understand the behavior of the complex underwater travel, a 3D finite element model was developed to verify and explain the fluid-structure mechanism of the jellyfish underwater. A new type of bioinspired control method was designed to enable adequate depth profile tracking. Two controllers were compared, and the depth profile was tracked in the ocean and pool. To check how the jellyfish explored and monitored the underwater environment, the new jellyfish was conducted to measure the lateral, vertical, passive rotation, and stable capabilities under different environments. 3D-axis swimming in different environment were conducted. Together, these results suggested that the soft robotic jellyfish could be used in the future for monitory marine life, studying the interactions of aquatic life and ocean dynamics.

Figure 2A:
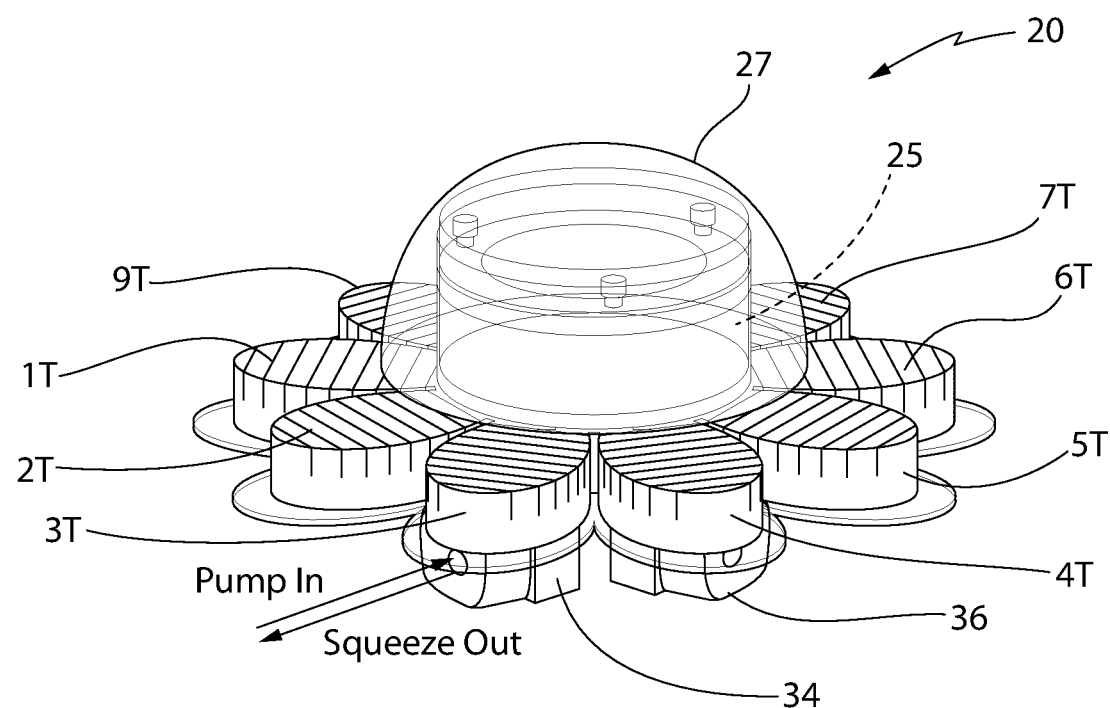
FIG. 2A is a functional diagram of the underwater robot apparatus.
Figure 2B:
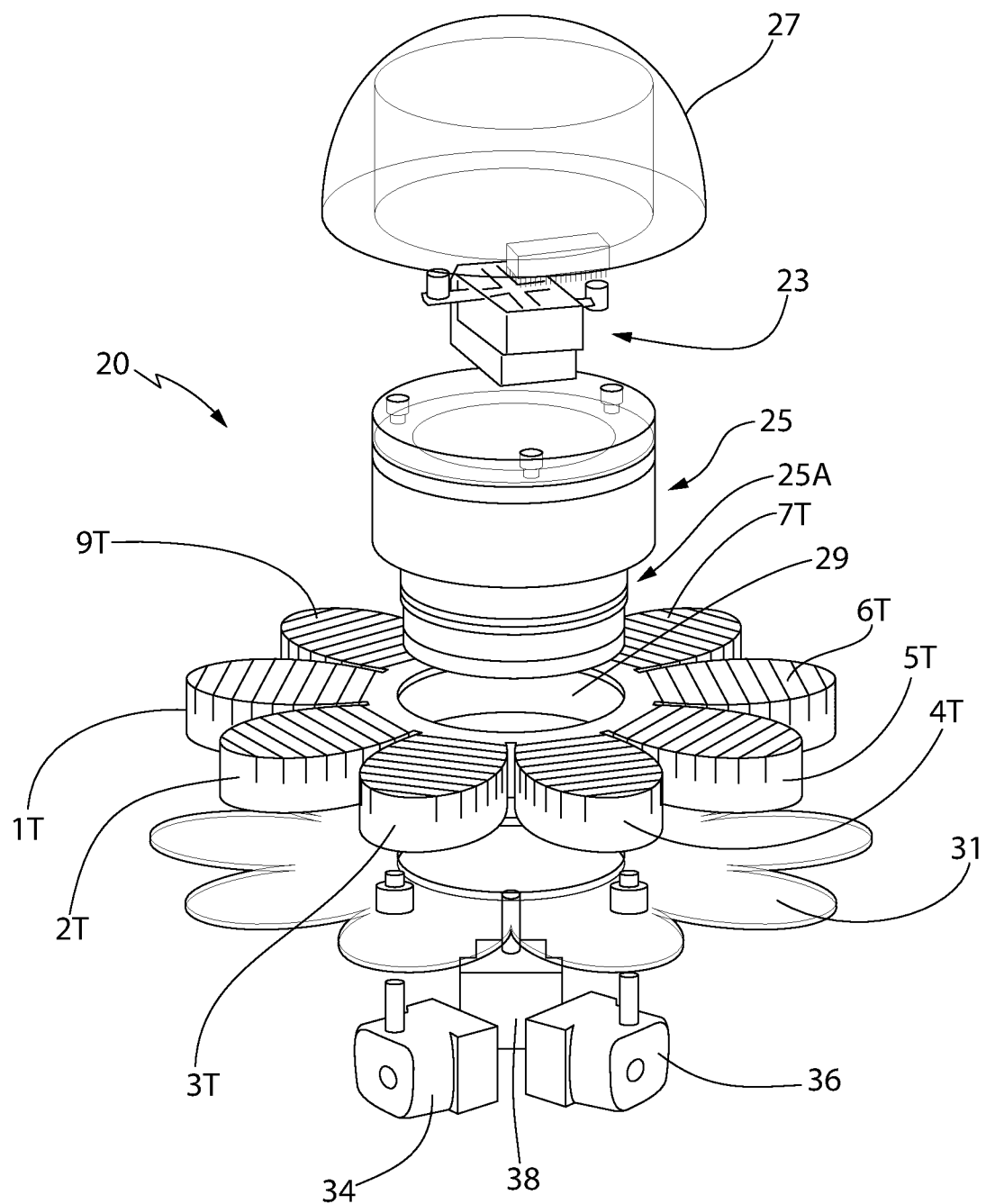
FIG. 2B is an exploded view of the underwater robot apparatus.
Figure 2C:
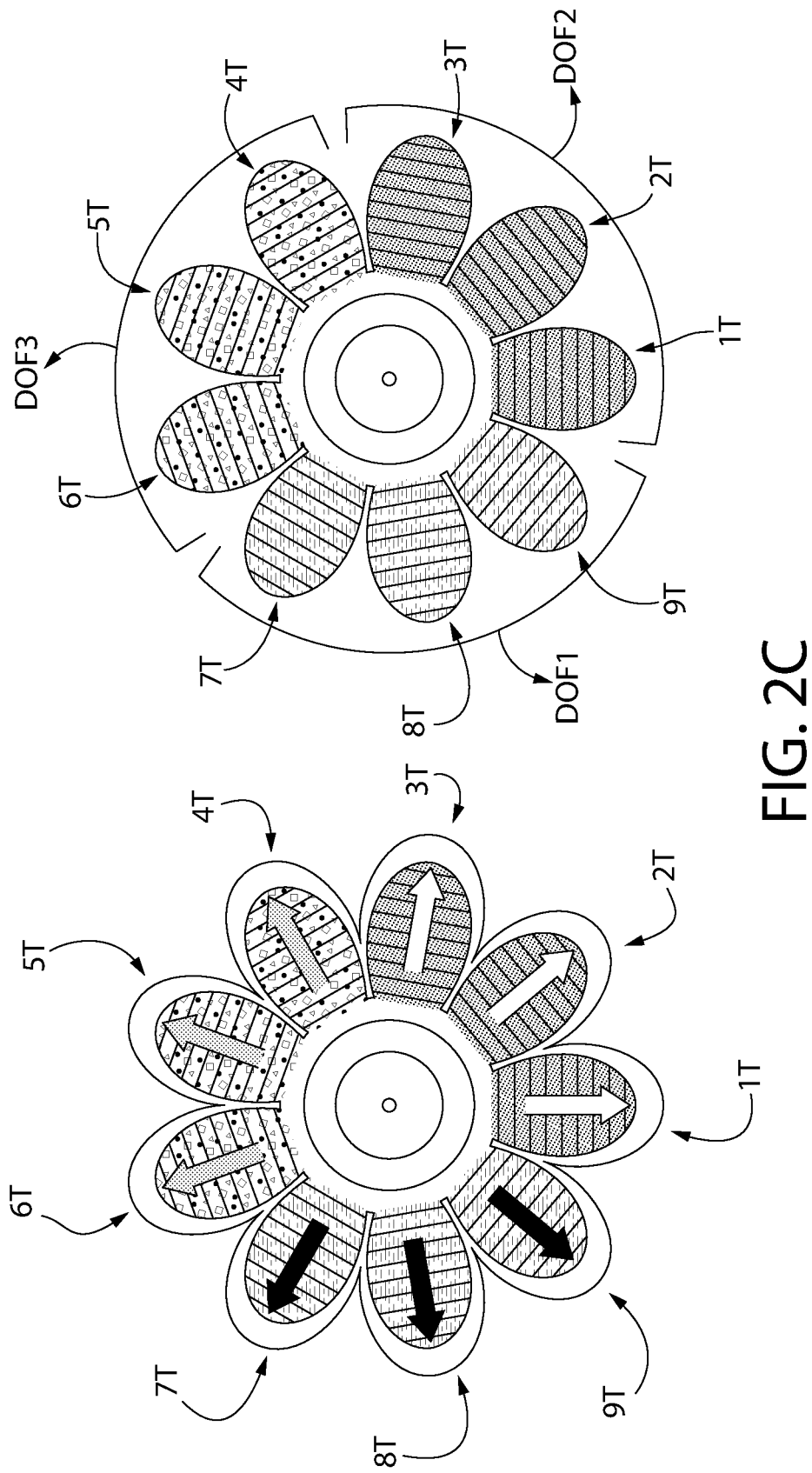
FIG. 2C is a top view and bottom view of the nine soft actuators, grouped in threes, and connected to respective submersible pumps, and showing three degrees of freedom.
Figure 2D:
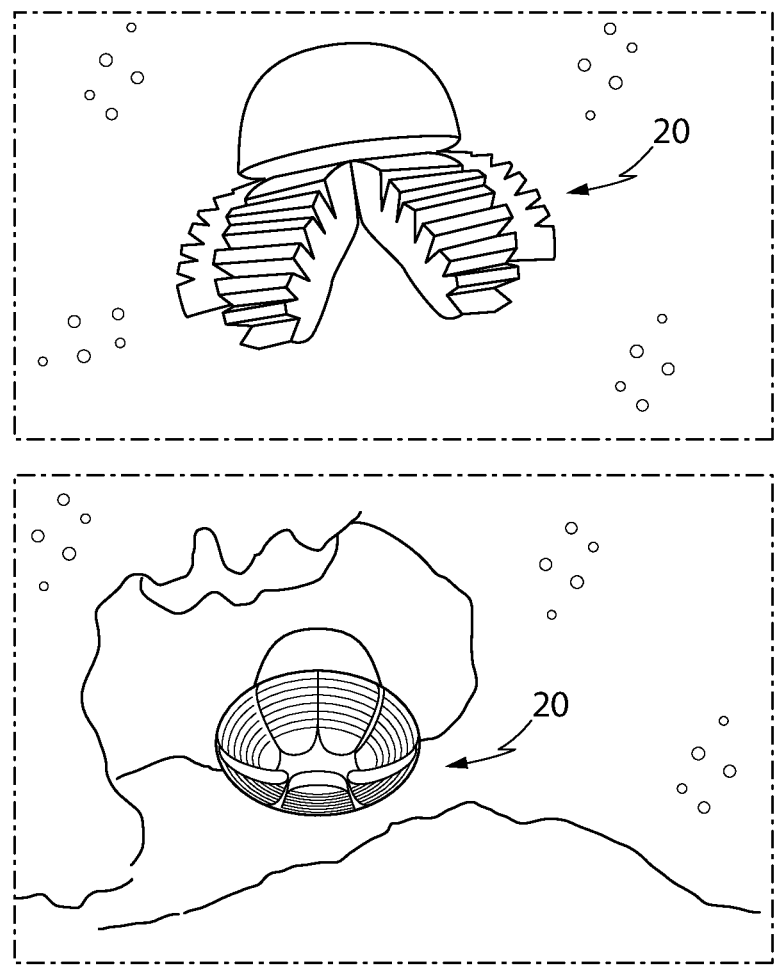
FIG. 2D depicts the underwater robot apparatus in the marine environment monitoring the same.

FIGS. 2A-2B depict the key components of the soft robotic jellyfish apparatus 20 including an electronics assembly 23 (e.g., adaptive controller 22, sensors/communications, etc., of FIG. 1.) that are positioned inside a housing 25 having a reduced diameter portion 25A that passes through a central aperture 29 in the soft actuators 1T-9T and actuator flap 31. A dome 27 covers all of the internals of the soft robotic jellyfish apparatus 20.

Results

The soft robotic jellyfish apparatus 20 comprises a fully embedded self-contained underwater robot jellyfish that swims independently and receives high-level commands from a human diver with temperature, light, and depth sensors (FIG. 1). The robot measures 0.3 m×0.3 m×0.2 m, weighs 1 kg, is neutrally buoyant, and can swim for about 3 hours. It propels itself by undulating its nine soft actuators 1T-9T in a cyclic manner and adjusts this undulation to swim horizontally or vertically.

Actuation Frequency and Amplitude Impacts Thrust Force

Figure 3A:
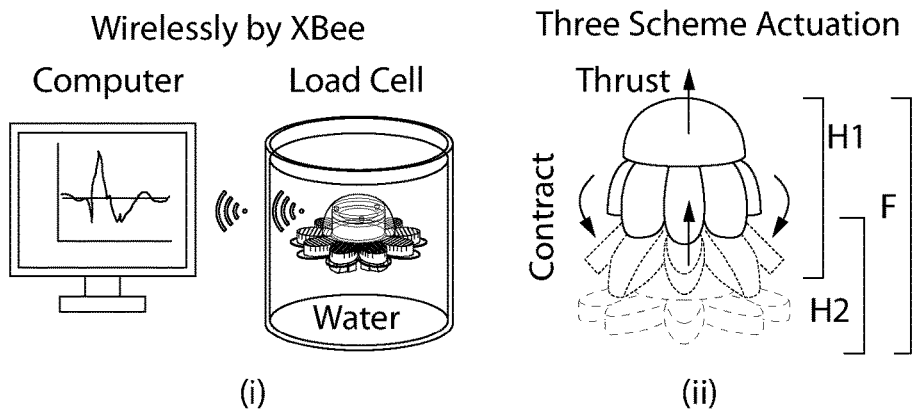
FIG. 3A(i) is a functional diagram of the wireless communication interface.

To understand the mechanism of the soft robotic jellyfish apparatus 20, wave tank and aquarium testing were conducted wirelessly by XBee to get the best actuation style and frequency (FIG. 3A(i)). Three different actuation amplitudes were tested on the inline load cell, as well as a range of frequencies for each actuation scheme shown in FIG. 3A(ii). A full stroke (F) went from the relaxed pose to a fully contracted pose, while a half stroke went from a halfway contracted to a fully contracted posture similar to the sequence. The difference between the second and third actuation schemes were the positions in the actuation cycle, the half stroke actuation 1 scheme (H1) started at a relaxed state and reaches to roughly 50% actuation and then began to relax. The half stroke actuation 2 scheme (H2) never reached a relaxed state but started at roughly 50% actuation and then reached full actuation before returning to 50% actuation. The wireless data collected from the load cell test helped quantify the qualitative performance seen in the free-swim testing. This new jellyfish ran on its onboard power supply for all inline load cell tests as it would for normal operation. For the load cell test, the vehicle was roughly six to eight inches under the surface of the water and at least 12 inches from any surface of the wave tank.

Figure 3B:
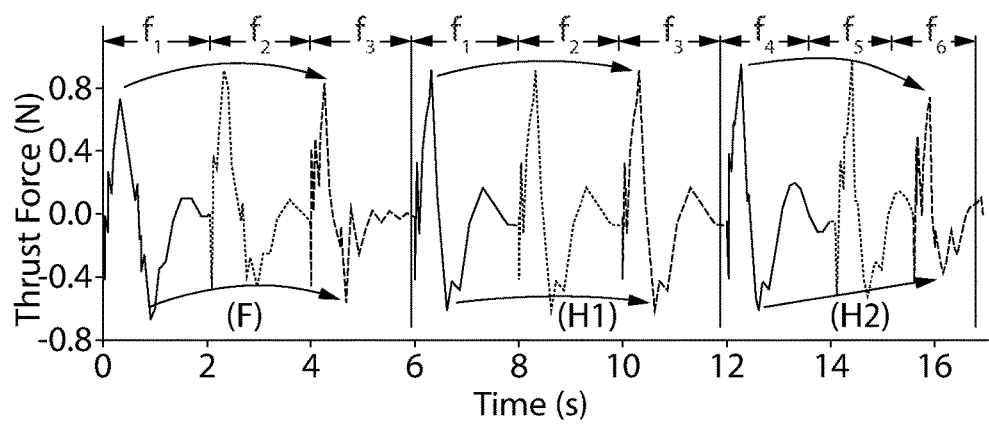
FIG. 3B depicts a graph of thrust force vs. time under the three different actuation schemes with different frequencies, $f_1$=0.1 Hz, $f_2$=0.2 Hz, $f_3$=0.4 Hz, f4=0.45 Hz, $f_5$=0.6 Hz and $f_6$=075 Hz.
Figure 3C:
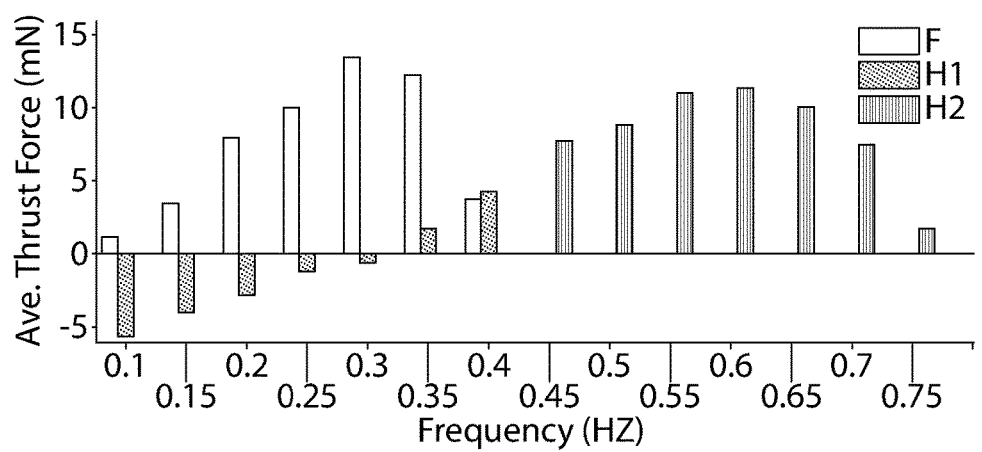
FIG. 3C depicts a graph of average thrust force vs. frequency for the three actuation schemes.

For each of the frequency tests, the robot was allowed to reach a steady-state and yield consistent and accurate results. Four illustrative cycles of each of the data sets was used to graphically display the forces acting on the load cell shown in FIG. 3A(i). Furthermore, FIG. 3B showed excellent repeated thrust force with all frequencies and all three actuation styles. FIG. 3B showed thrust force with time under three different actuation schemes with different frequencies. Under all conditions, the positive thrust generated by the exhaust of the pumps occurred due to the elasticity of the silicon rubber material constricting the water out of the tentacle actuators, through the impeller pumps, and into the environment. The F scheme uses a pump engagement time of 600 milliseconds to actuate the tentacles from a relaxed stage to fully actuated, while the H1 and H2 schemes use a pump engagement time of 300 milliseconds and varying relaxation times to create two different actuation schemes. The main reason was due to the relaxation times required for the actuators to return to a neutral position, where there was a limit of the frequency ranges that could be applied to each type of actuation scheme. Due to the long pump engagement time, the risk of over-inflating the actuators limited the full stroke to a frequency range of 0.1 Hz to 0.4 Hz, while possible frequency range for half stroke 2 was from 0.45 Hz to 0.75 Hz. From the comparison of three different frequencies in full stroke scheme, the highest thrust force and lowest thrust force has the same trend, where the thrust force increased from f1 to f2 before decreasing to f3. The same trend happened in the H1 scheme, while the lowest thrust force increased from f4 to f6 in the H2 scheme. The largest mean thrust forces were produced with a full stroke actuation amplitude at a frequency of 0.3 Hz (FIG. 3C). The upward free-swimming, depth control, and ocean tests the vehicle's operational model was all based on 0.3 Hz of the full stroke actuation scheme. During the free-swimming tests, the most effective upward motion was created by a pump engagement time of around 600 milliseconds and a relaxation period of roughly 2733 milliseconds.

Multi-Physics Simulation of Actuation System

To further understand the inner flow-structural-outer flow mechanisms of the underwater jellyfish under different frequencies and different loads, a computational simulation was used to observe the distributions of the fluid, pressure and structural displacement.

It is theorized that the improved performance of this operational mode is dependent on the balance between the frequency of thrust being produced as well as the time the tentacles are engaged. When the tentacles are engaged, the cross-sectional area of the vehicle decreases significantly, creating a more streamline body. When the vehicle is in this improved hydrodynamic shape, it can better utilize the thrust forced being produced by the pump engagement phase of the actuation cycle. Additional data from the load cell test supports this theory because of the difference in performance between the two half stroke actuation schemes. Half stroke actuation scheme 1 was significantly less capable of producing net upward thrust compared to half actuation stroke 2. It is believed that because the half stroke actuation 2 never relaxed passed 50 percent contraction, the vehicles had a smaller cross-sectional area and, therefore, a better hydrodynamic shape. This theory could not be proven with load cell testing due to the zero-speed condition of the tests.

Figure 4A:
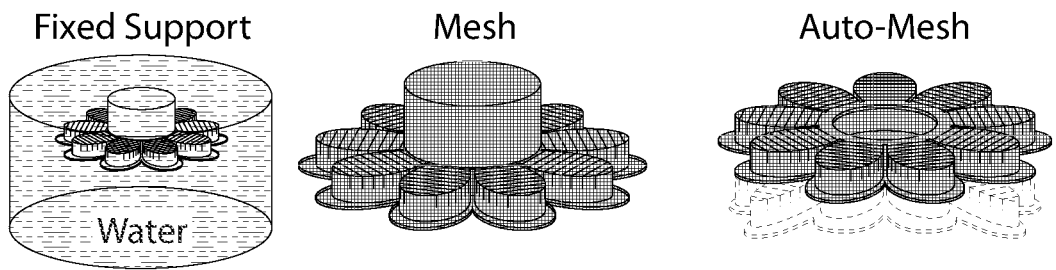
FIG. 4A depicts the boundary condition with a fixed support in the aluminum and the water around the underwater robot apparatus in an inner fluid-structural-outer fluid system multi-physics simulation of the actuation system of the underwater robot apparatus underwater.
Figure 4B:
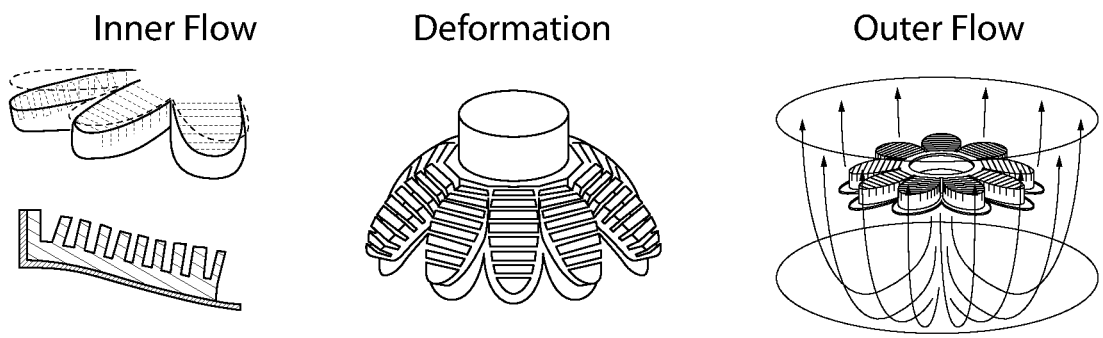
FIG. 4B depicts the inner flow, deformation, and outer flow in the simulation.
Figure 4C:
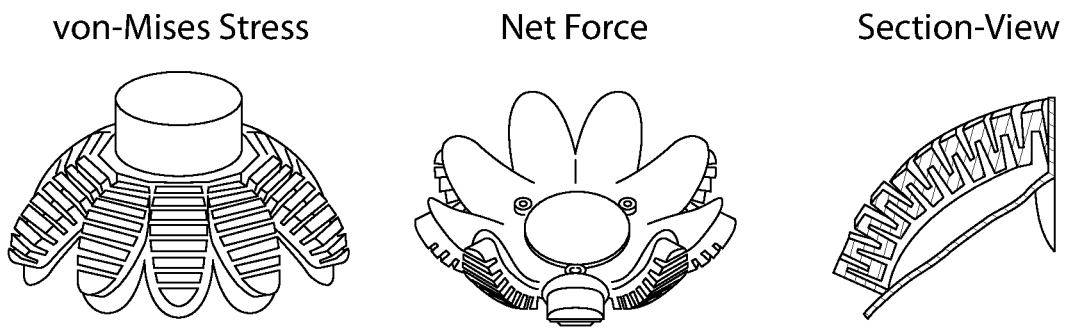
FIG. 4C depicts von-Mises stress and net force in the simulation.

FIG. 4A depicts the boundary condition with a fixed support in the aluminum and the water around the jellyfish in an inner fluid-structural-outer fluid system multi-physics simulation of the actuation system of the soft robotic jellyfish apparatus underwater, using a mesh design and an auto-mesh design. FIG. 4B depicts the inner flow, deformation, and outer flow in the simulation. FIG. 4C depicts von-Mises stress and net force in the simulation, as well as a section view of one actuator.

Depth Profile Tracking: Controller Comparison

Applicant has previously shown that this type of robot exhibits nearly undamped system dynamics under position control [38]. Therefore, a new type of bioinspired control method was designed to enable adequate depth profile tracking. Depth was measured by the onboard pressure sensor 26, which the microcontroller 22 converted into depth. A series of depth-holding tests were conducted to compare the performances of both the bang-bang and the adaptive bioinspired controller. FIGS. 5A-5E show the initial controller testing results, which display that both controllers were capable of holding a depth, but there is a statistical difference between the initial adaptive bioinspired and bang-bang controller trials. The adaptive trials more consistently and more closely held the target depth. To ensure consistent and repeatable results, the same starting point above and below the target threshold was measured and utilized for the continuing comparison tests. The next set of trials were held at a depth of 1 m and can be seen in FIGS. 5A-5E. This set of depth trials was also analyzed using anova1, and the results can be seen in supplemental Table 2 (below). While starting at the same point above the threshold of 1 m, the difference between the adaptive bioinspired and bang-bang controller was proven to be statistically significant, with a Prob>F being 0.0011.

Figure 5A:
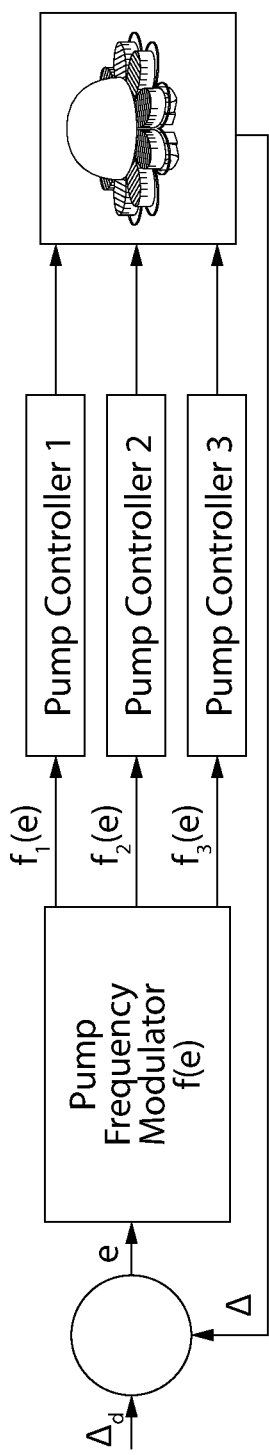
FIG. 5A depicts a control diagram of the soft actuators of the present invention.
Figure 5B:
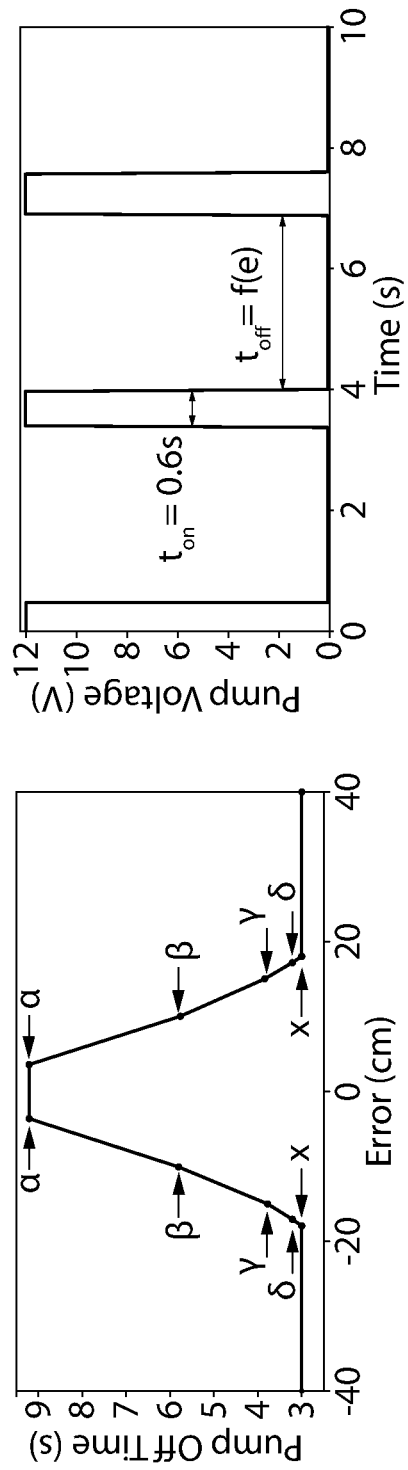
FIG. 5B(i) depicts a plot of the pump off time vs. error.
Figure 5C:
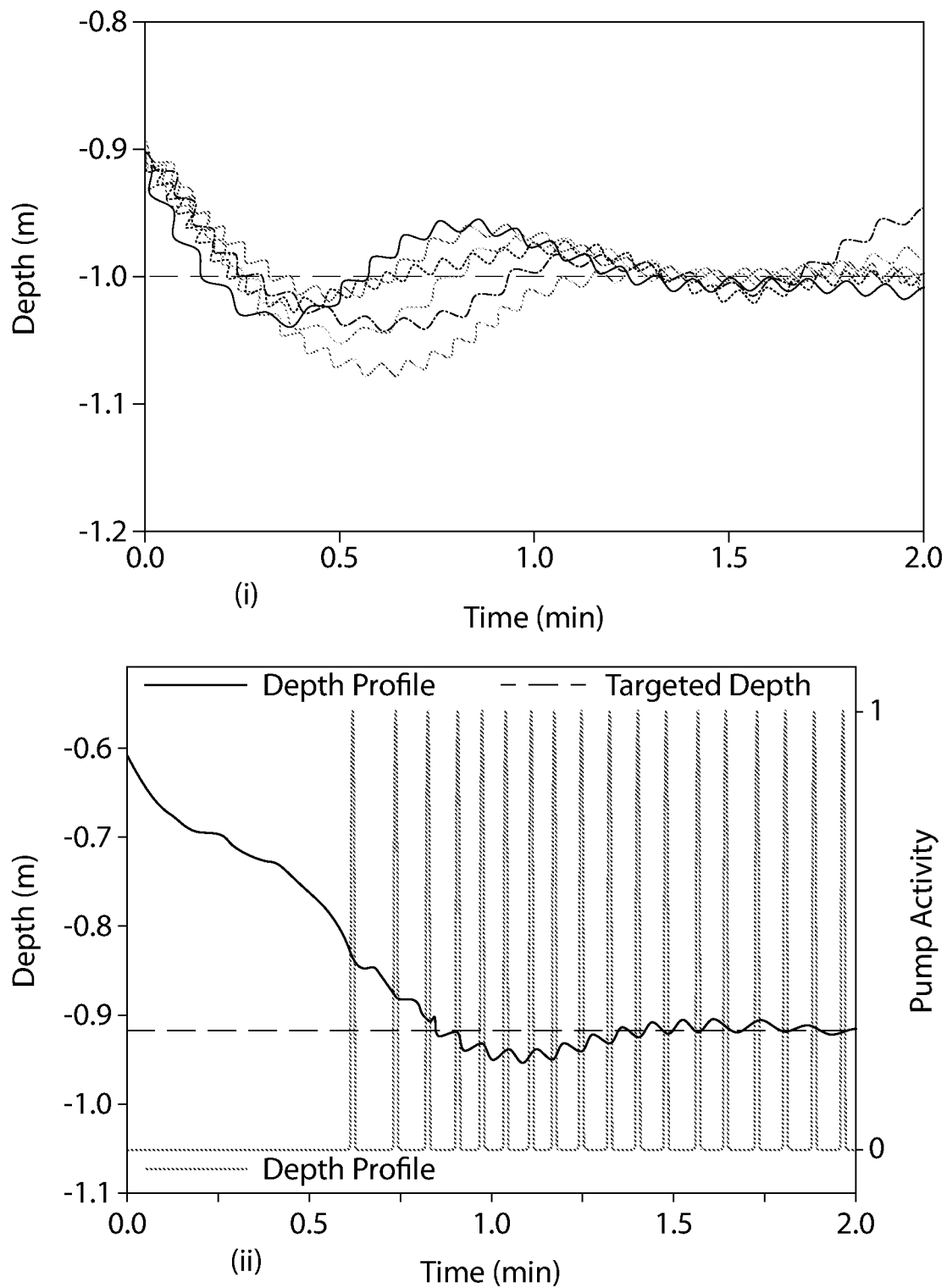
FIG. 5C(i) depicts the depth vs. time plot for the adaptive controller.
Figure 5D:
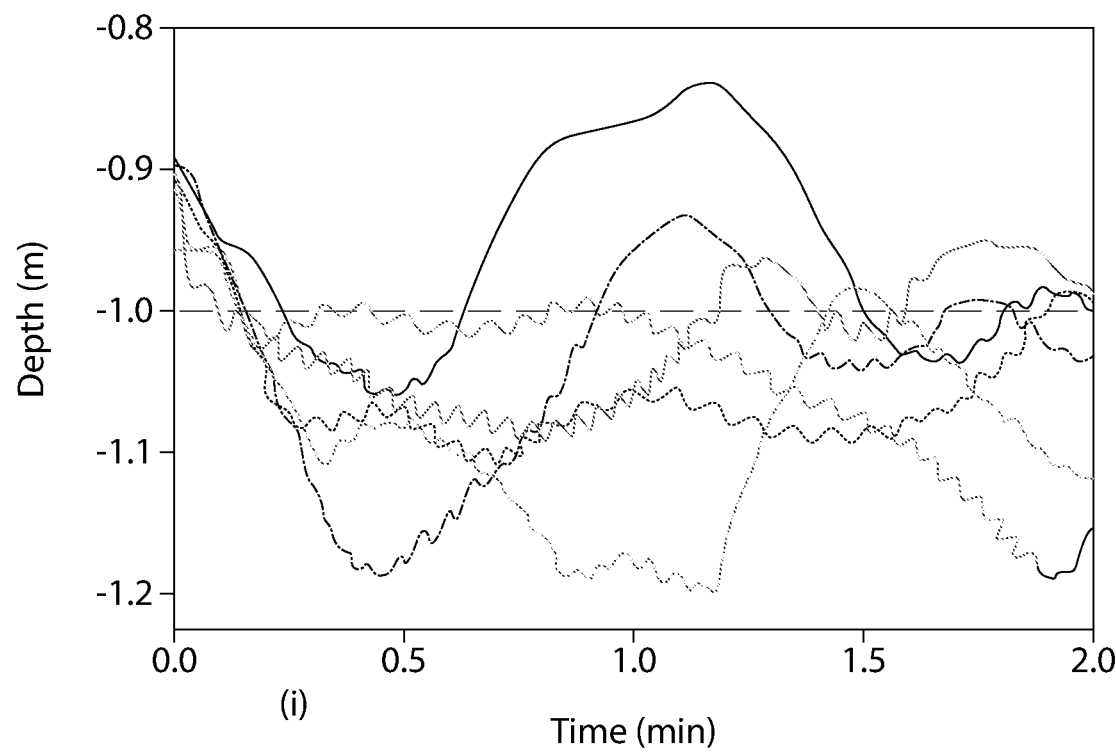
FIG. 5D(i) depicts a plot of depth vs. time plot for the bang-bang controller.
Figure 5D:
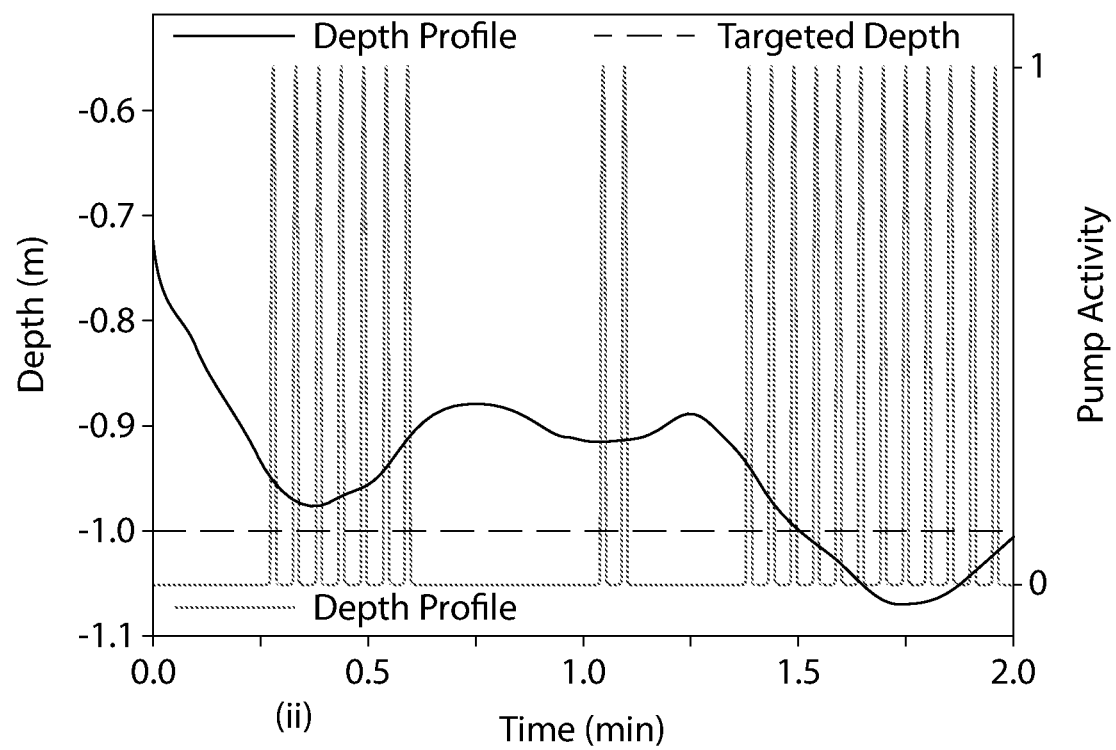
Figure 5E:
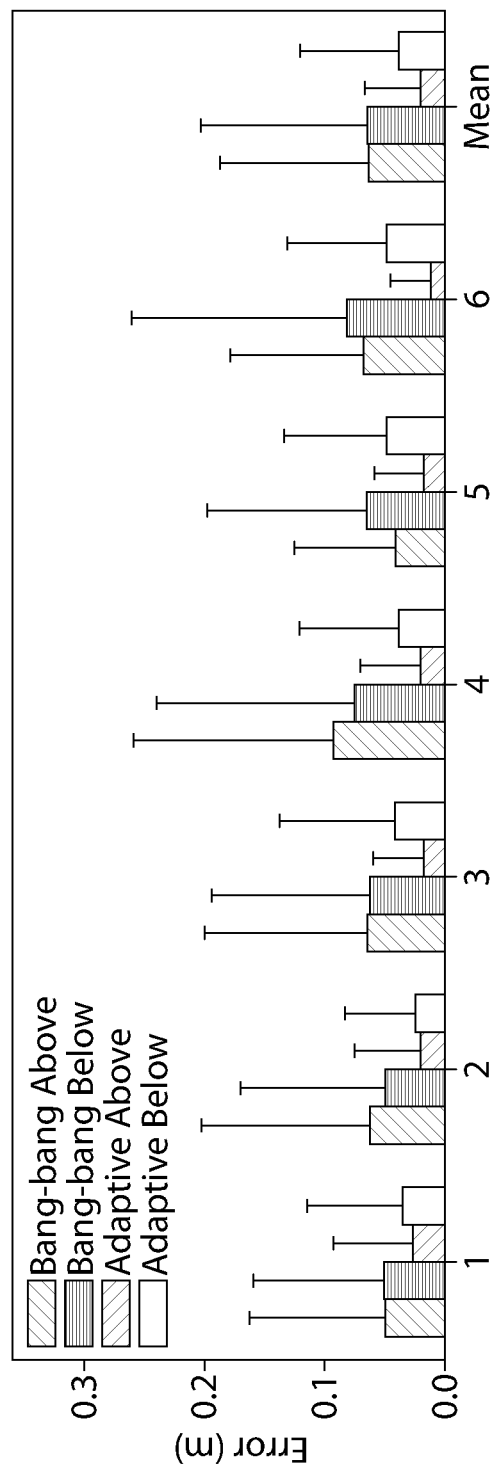
FIG. 5E depicts a plot of the error vs. controller (bang-bang or adaptive and whether above or below the threshold depth)
Figure 6A:
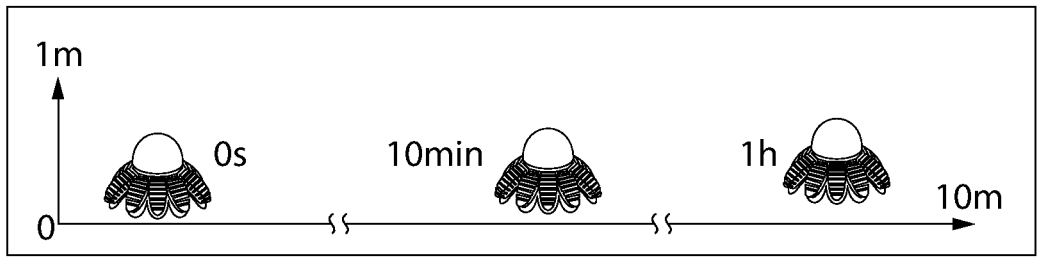
FIG. 6A depicts underwater exploration and quantitative experiments in marine environment at night.
Figure 6B:
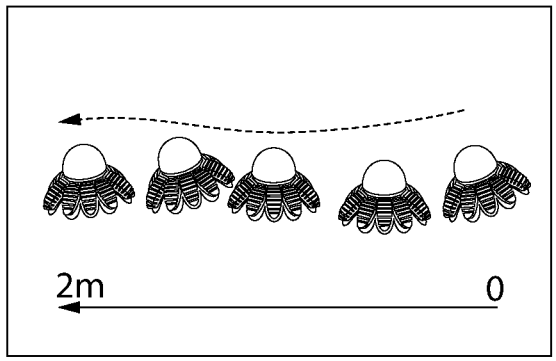
FIG. 6B depicts underwater exploration and quantitative experiments in marine environment with Scuba.
Figure 6C:
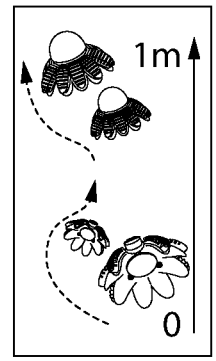
FIG. 6C-FIG. 6E depicts underwater exploration and quantitative experiments in marine environment whereby the soft robotic jellyfish apparatus rotates.
Figure 6D:
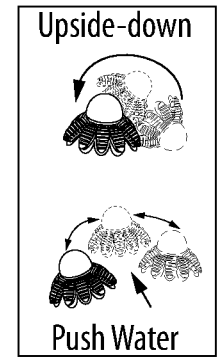
Figure 6E:
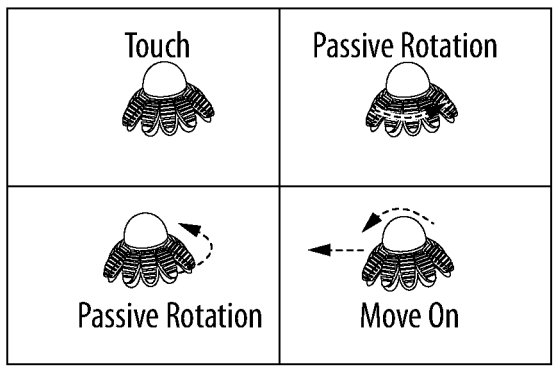
Figure 6F:
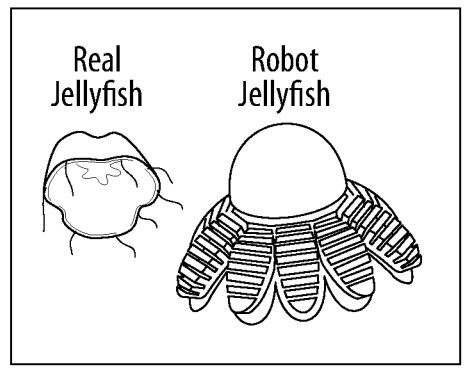
FIG. 6F depicts underwater exploration and quantitative experiments in marine environment of the soft robotic jellyfish apparatus versus real fish.
Figure 6G:
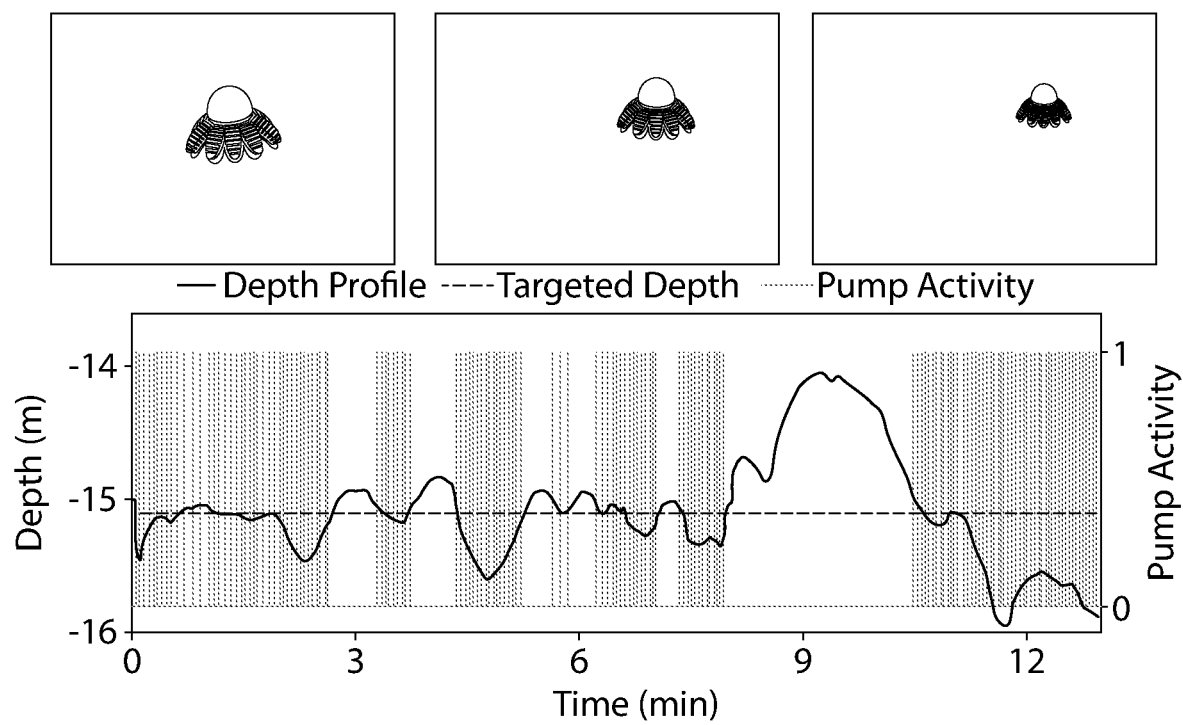
FIG. 6G depicts underwater exploration and quantitative experiments in marine environment ocean test data.

The final set of depth trials held at 1 m, where the starting point was below the threshold, can be seen in FIGS. 5C-5D. Results of the two controller trials we analyzed using anova1 and were proven to have a statistical difference between the two controller data sets. The anova1 results can be seen in Table 1 were the Prob>F value was 0.0022. The mean error and standard deviation of the below threshold trials were calculated and can be seen represented in a side by side comparison bar plot in FIG. 5D. A two-way analysis of the adaptive bioinspired and bang-bang controller depth trials was conducted using the anova2 function in MATLAB. The two-way analysis calculated the statistical difference between the two controllers, and the statistical difference between the starting points. The results of the analysis show again that there is a statistical difference between the two controllers, but it also showed that the Prob>F value for the rows was 0.048. The row Prob>F value was smaller than 0.05, which proves a statistical difference between the starting point of the respective trials.

Depth Profile Tracking in the Ocean and Pool

The free-swimming results show that the soft robotic jellyfish apparatus 20 is capable of upward and omnidirectional lateral travel as well as prove the vehicle is capable of performing in uncontrolled ocean environments (FIGS. 6A-6G). Pool testing was used to calculate upward swimming speeds, to test lateral motion and test controller performance. Upward swim tests with the pressure vessel dome cover applied and upward swim test results without the pressure vessel dome cover were also conducted. In each of these tests, the vehicle was slightly negatively buoyant so that all upward motion was based on actuation thrust and not positive buoyancy. The ability to overcome negative buoyancy was critical for proving the depth control hypothesis.

Using the anova1 function in MATLAB, a one-way analysis of variance was conducted on the upward swimming trials to compare the statistical difference between the vehicle's performance with and without the dome. The results from this analysis show that there is a statistical difference between having the dome on compared to off during the second 15.3 cm of travel with a Prob>F value of 0.0053 but not the first 15.3 cm or first 30.6 cm traveled with values of 0.0715 and 0.0502 respectively. The performance of the lateral motion of the vehicle was quantified using Kinovea motion tracking software to calculate the velocity at which the vehicle traveled. The results of the testing can be seen in the table below.

TABLE 1

Vertical Swimming Performance of Soft Robotic Jellyfish 20 with Dome

| | Trial 1 | Trial 2 | Trial 3 | Average Velocity |
|---|---|---|---|---|
| Velocity between 15.3 cm (cm/s) | 1.95 | 2.89 | 2.31 | 2.38 ± 0.453 |
| Velocity between 30.6 cm (cm/s) | 2.51 | 3.3 | 2.86 | 2.89 ± 0.396 |

TABLE 2

Vertical Swimming Performance of Soft Robotic Jellyfish 20 without Dome

| | Trial 1 | Trial 2 | Trial 3 | Average Velocity |
|---|---|---|---|---|
| Velocity between 15.3 cm (cm/s) | 1.81 | 1.72 | 1.25 | 1.59 ± 0.3 |
| Velocity between 30.6 cm (cm/s) | 2.28 | 2.21 | 1.64 | 2.04 ± 0.351 |

Results of these tests demonstrated that the soft robotic jellyfish apparatus 20 was capable of overcoming negative buoyancy and producing significant upward motion, which was shown by the production of positive net thrust in the load cell testing as well as in the free-swimming tests. In the previous study, the Applicant had designed five unique soft robotic jellyfish with eight network tentacle actuators and they were able to freely swim untethered in the ocean, to steer from side to side, and to swim through orifices more narrow than the nominal diameter of the jellyfish. In contrast, with larger volume and more mass than its predecessor, the soft robotic jellyfish apparatus 20 would take more actuation cycles to get significant upward motion with three pumps and the tradeoff was worth the additional sensors and deeper operational depth. The adaptive bioinspired and three-axis control jellyfish enabled a 3D-axis swimming with lateral, vertical, passive rotation, and stable capabilities in different environment.

In the present invention 20, the variable frequency was designed in response to natural jellyfish sensory inputs. The full stroke actuation scheme at a frequency of 0.3 Hz was selected based on the comparison of three kinds of actuation scheme jellyfish that were compared and selected from frequency 0.1 Hz to 0.75 Hz. The load cell test not only proved the hypothesis but helped optimize the performance of the upward swimming locomotion. The quantitative data from the load cell tests guided which operation frequencies would be the most effective.

Additionally, the soft robotic jellyfish apparatus 20 has shown excellent depth control. After a series of depth holding trials were conducted with two different controller methods, the vehicle was capable of maintaining a predetermined depth with a low error. It is important to note that due to the difficulty the vehicle has in initial acceleration and the compressibility of the soft actuator body, the buoyancy needs to be adjusted for specific operating depths. Due to the buoyant force lost with the compression of the actuators at depth, the operational range is limited to roughly half a meter from the depth the vehicle is set to be neutrally buoyant at. By reducing the mass of the pressure vessel and using denser actuator material, the operation range could be increased. If a broader range of depths are desired, more research will need to be conducted, potentially looking into variable buoyancy systems to help compensate for the actuator body.

The free-swimming lateral motion of the present invention 20 provides another advantage over other jellyfish robots. With an average horizontal velocity of 1.45 cm/s using any two sets of tentacles, it was shown, depending on the further advancement of this platform, that guided complex travel would be possible.

As mentioned previously, Bluetooth sensor/module 32, depth sensor 26, temperature sensor 24, and light sensor 28 were embedded in this platform.

3D Printing

The soft robotic jellyfish apparatus 20 required multiple 3D printed components as well as the 3D printed molds for the jellyfish body construction. The three mold parts have a footprint of roughly 10.7 inches by 10.7 inches and required a 3D printer with a large print bed, the Taz Luzbot 6 was used to print these parts. The other components are the battery holder and pump inlet nozzles, and all can be printed on a 6-inch by 6-inch print bed at any time during construction. All components were printed from PLA and were Solidworks models that were converted into STL files and loaded into CURA 3D printing software.

Machining

The soft robotic jellyfish apparatus 20 has four parts that require CNC machining, the clear Lexan end cap, the Delrin pressure vessel body, the 6061 Aluminum pump end cap and the high-density foam. The Solidworks models of each part were converted into Gcode operations using Mastercam, which was used by the CNC mill to machine the parts. The machining step can be done while the molds are being printed. It is recommended to machine the Delrin pressure vessel body and high-density foam first, while the molds are printing, so when the molds have been finished the construction of the jelly fish body can begin. The next part to be machined should be the aluminum pump cap. The pump cap acts a penetrator for the pumps and temperature sensor and needs to be waterproofed with epoxy.

Fabrication

The body fabrication stage takes approximately 36 hours for completion and is done in multiple stages. The materials and tools needed for the construction of jellyfish body are the 3D printed molds, the fabric or paper material used in the PneuNet bending actuators (roughly 10.7 inches by 10.7 inches), the machined pressure vessel body and foam ring, the 8 lbs. containers of Ecoflex 00-30 part A and Ecoflex 00-30 part B, 35 grams of glow in the dark material (e.g., a phosphorescent, luminescent or glowing material, etc.,) scissors, felt pen, three 1 quart mixing containers, small food scale, hot glue gun, marine silicon glue, aerosol universal mold release, vacuum pump and vacuum chamber. By way of example only, this glow in the dark material may be mixed into the formation of one or more of the actuators 1T-9T. Thus, when the glow in the dark material is initially exposed to light, the glow in the dark material then can emit light, thereby illuminating the dark marine environment.

Firstly, a stencil was formed out of cardboard to create an actuator pattern on the support fabric material used in the bottom of the actuator. A felt pen was used to trace the actuator stencil on the fabric material. Cut along the traced line in the fabric to create the support piece used in the bottom of the actuator.

Figure 7A:
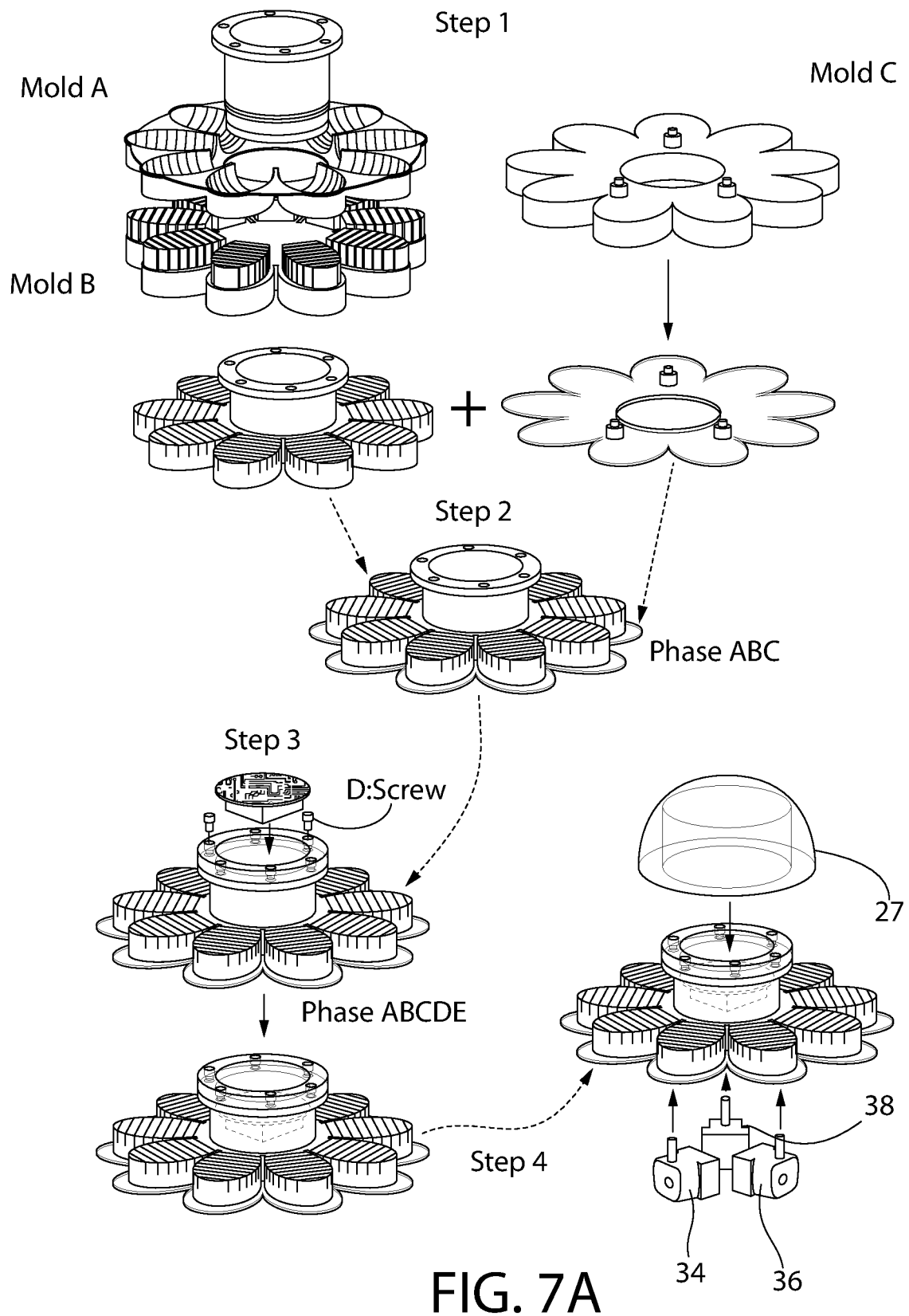
FIG. 7A shows the steps used in the formation of the present invention.
Figure 7B:
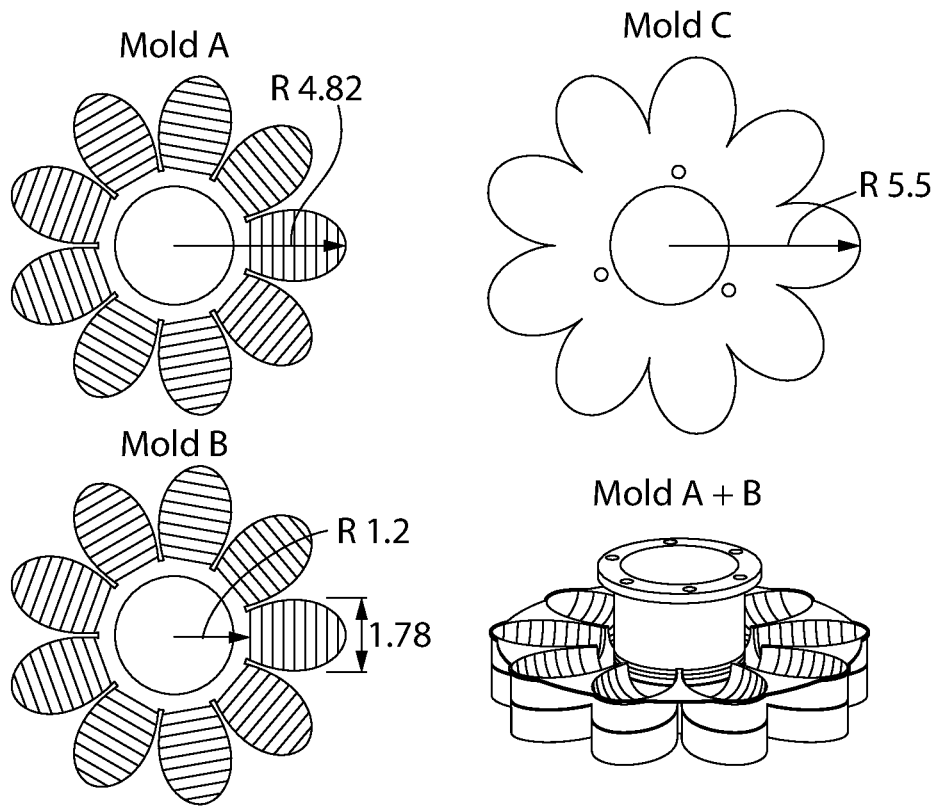
FIG. 7B shows top views of the different molds used in the process of FIG. 7A.
Figures 7C, 7D:
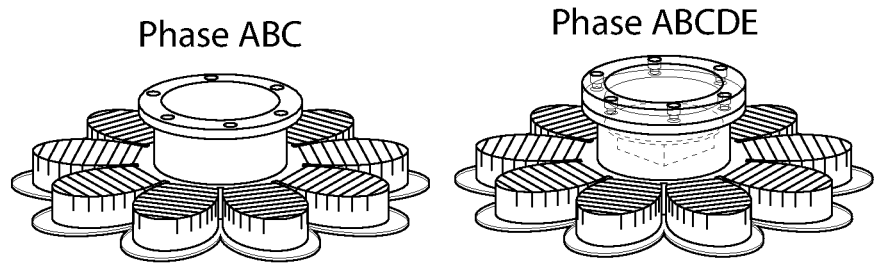
FIG. 7C is an isometric view of the phase ABC of the process of FIG. 7A.
FIG. 7D is an isometric view of the phase ABCDE of the process of FIG. 7A.
Figure 7E:
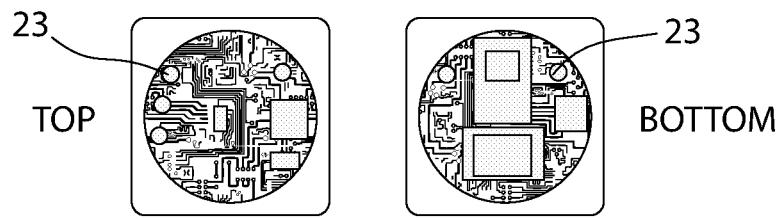
FIG. 7E are top and bottom views of the electronics assembly used in the process of FIG. 7A.

Secondly, molds were printed properly and any rough spots were sanded and cleaned. The molds were sprayed with mold release to ensure that the cured Ecoflex was able to be removed from the molds. There are two sets of molds for the jellyfish body one of which is made up of two parts. These molds were labeled A, B, C and combined as seen in FIG. 7A, with top views of these molds being depicted in FIG. 7B. The assembly of phase ABC is shown in FIG. 7C and the assembly of phase ABCDE is depicted in FIG. 7D. The electronics assembly 23 (top and bottom views shown in FIG. 7E) is inserted in Step 3 of FIG. 7A.

Mold release was used generously and was applied to the working surface of the molds. Once the mold release was applied to the molds, mold A was placed into position over mold B and hot glue was applied at the seam where the two molds met, shown in FIG. 7A. The hot glue was used to hold the molds together as well as keeping the Ecoflex from leaking out of the molds. Once the hot glue was dried, the machined pressure vessel and foam ring were placed into the center of the combined molds and the pressure vessel was properly aligned. If the pressure vessel body is not aligned properly to the mold, the actuators will not align with the pumps. The bottom of the foam ring should be level with the top of mold A, flip the mold and pressure vessel body over and hot glue the seam where the bottom of the pressure vessel meets the bottom of mold B.

Pouring both molds requires approximately 16 fluid ounces of Ecoflex. It is recommended to break the 16-ounce batch into two 8-ounce batches, due to the working life of Ecoflex 00-30 and to allow the batches to spend enough time in the degasser to remove all the bubbles. If glow in the dark pigment is being used, zero the quart measuring cup on the food scale and pour in about 15 grams of glow powder into each of the quart measuring cups. Measure out 4 ounces of Ecoflex 00-30-part A into one of the measuring cups, then thoroughly mix the 15 grams of glow powder into the 4 ounces until a consistent color is achieved roughly one minute and there is no glow powder left at the bottom. After being mixed, pour 4 ounces of the Ecoflex 00-30-part B into the container and mix until consistent color is achieved roughly one minute. Once part A and B are mixed there is about a 25-minute working time before the Ecoflex starts to harden, so be prepared to both batches in one sitting. Place the first batch into the vacuum chamber and degas the Ecoflex until all the bubbles have been removed, roughly five minutes. The combined mold A & B will take the entire first batch into the mold and still not be filled, repeat the process used to make the first batch to make the second batch and fill the mold to the top. Using the remains of the second batch create a thin layer of Ecoflex on the bottom of mold C and fill the low nozzle points. Place the previously cut fabric support material into mold C aligning it to the nozzle ports on the mold. Using what is left of the Ecoflex pour over the fabric support material covering it completely and filling the remainder of mold C.

Finally, after 4 hours passed the combined molds A & B can be separated and the cured Ecoflex and pressure vessel can be removed as one piece. Mix 50 ml of each Ecoflex 00-30-part A and part B with the remaining 5 grams of glow powder and place in the vacuum chamber as before. Pour the Ecoflex to create a thin layer on top of the cured Ecoflex in mold C. Then place the combined Ecoflex jellyfish body and pressure vessel into the center of mold C, aligning the actuator tentacles patterns to match with their respective nozzle locations.

Assembly and Testing

After all the parts have been machined and dried, respectively, the assembly and testing of the soft robotic jellyfish apparatus 20 could begin. Assemble the vehicle by aligning hole in the pump cap and the pressure sensor mounted in the bottom of the pressure vessel. Ensure that the O-ring is seated properly and tighten down all six-socket cap screw and attach the pumps with the appropriate hardware. Then connect the battery and all Molex connectors to the printed circuit board and tighten down the mounting hardware to hold the board and battery in place. The pressure vessel was tested in the pressure chamber at the Dania Beach campus, to simulate depth operations. The pressure vessel was tested to 100 PSI for thirty minutes, which simulates operational depths of roughly 230 feet. Code was loaded on to the TEENSY microcontroller 22 using Arduino, to test that all the sensors and components were operating properly.

Soft Robotic Jellyfish Apparatus 20 Electronic Components

The custom-built printed circuit board was shown in FIG. 8A. The board was 2.9 inches in diameter and had three mounting holes built in to hold the board in place inside the pressure vessel. The board consisted of two A3212EUA hall effect sensors, one reed relay, an XBee/XBee PRO ZigBee RF module 32, an Adafruit 1660 micro SD card slot, a removable TEENSY 3.2 microcontroller 22, a MPU 9250 nine axis motion tracking device 30, a removable ISL 29125 RGB Light sensor 28, two green LEDs, one red LED, as well as Molex connectors for the MCP9701A Temperature sensor 24, 85-100A-4R pressure sensor and three pump submersible water pumps 34, 36 and 38. The board also contained many additional electronic components needed for operation, such as voltage regulators, diodes, resistors etc.

The two Hall effect sensors and the reed relay were used as functional sensors, allowing commands to be sent to the vehicle without having a wired connection or wireless communication options. The reed relay acted as the ignition system and when in the presence of a magnetic field, would complete the circuit and allow power to the entire system. The reed relay was useful because it gives the user the ability to activate the vehicle underwater which saves battery life and allows effective operation of the system. The two hall effect sensors can be used in a plethora of ways from activating and terminating programs to shutting down the vehicle entirely, depending on the Arduino code. For the purpose of the present application, the two Hall effect sensors were used to start underwater operations and to turn off the vehicle when in the presence of a magnetic field. The three LEDs built into the printed circuit board as well as the LED built onto the TEENSY, were used as visual confirmation and feedback to the operational status of the vehicle. Depending on the Arduino code the LEDs can represent any number of things from low battery to pump activation status.

The XBee RF module 32 was soldered directly onto the printed circuit board and had an antenna that was fixed to the highest point of the board. The XBee 32 was used to send commands as well as information regard the health of the vehicle and sensor data being acquired. The XBee signal was able to penetrate about four to five inches underwater during the inline load cell test, which allowed all of the different actuation frequencies and stroke length tests to be conducted without having to remove and open up the jellyfish. The XBee 32 helped minimize the amount of times the pressure vessel needed to be opened and closed, which extends the life of the vehicle and decreases the chances for O-ring damage and failure. The Digi USB XSTICK was used with XCTU software and a computer to communicate wirelessly with the onboard XBee.

The TEENSY 3.2 microcontroller 22 was used for its small size, number of I/O pins and the processing capabilities were well within the ranges desired for operation. The TEENSY microcontroller has a 32-bit ARM processor and runs using 3.3V. TEENSY 3.2 microcontrollers can be programmed with Arduino IDE, which is free, open source software. The 11.1V 850 mAHr LiPo battery pack powers the microcontroller 22 as well as the rest of the vehicle. FIG. 8A shows the TEENSY block diagram and basic structure of the electronic components in the vehicle.

There are four sensors onboard the soft robotic jellyfish apparatus 20 that take environmental data or data on the vehicle's position. All data collected by these sensors were saved to a 16 GB micro SD card using the micro SD card slot on the printed circuit board. The ISL 29125 light sensor 28 was built into the top of the printed circuit board and was designed to be as close to the clear pressure vessel lid as possible. There are three different photodiodes on the light sensor, one for each red, green and blue light. Each of the photodiodes take in light and measure the light intensity of their respective color. There were two operational modes for the light sensor 28, a 375 Lux range and a 10000 Lux range. The 375 Lux mode had a lower maximum light intensity but has a greater resolution. The MPU 9250 nine degree of freedom internal motion unit 30 can be used to track the orientation and heading of the vehicle. Both the MPU 9250 IMU 30 and the ISL29125 light sensor 28 use I2C serial protocols compared to the other sensor which analog inputs. The temperature sensor 24 and the pressure sensor 26 were the only two sensors that required being in the ambient environment for data collection. The pressure sensor 26 has a waterproofed portion that is designed to be screwed into an NPT thread where just the waterproof portion is exposed. The temperature sensor 24 was potted in epoxy so that the sensor can be exposed to the ambient water and keep the pressure vessel watertight.

FIG. 8B depicts the electronics assembly 23, showing the temperature and light sensors embedded in the apparatus 20. FIG. 8c(i) depicts the present invention in an ice bath following 15 minutes in a room water temperature while FIG. 8C(ii) depicts the temperature response with the time between the aluminum pressure vessel system and the Delrin pressure vessel. FIG. 8D(i) depicts the test set up for measuring battery voltages and pump activity on an oscilloscope display. FIG. 8D(ii) depicts the voltage drain on each cell of the LiPo battery during the test. FIG. 8E(i) compares a real fish with the apparatus 20 while FIG. 8E(ii) depicts a plot of light intensities with respect to time.

Software

The operating software used for the soft robotic jellyfish apparatus 20 was written in Arduino IDE and design to be as versatile but simple as possible. One portion of the program controls the user interface with the vehicle, i.e., initializing operational parameters, powering on vehicle, visual feedback, starting operation, stopping operation and powering down vehicle.

Multi-Physics Finite Element Method

The flow of the underwater system was assumed to be laminar Newtonian, viscous and incompressible. The Navier-Stokes equations in Lagrangian-Eulerian formulation were used as the governing equations:

$$(\partial \rho\_f)/\partial t + \nabla \cdot (\rho\_f u) = 0 \quad (1)$$

$$(\partial (\rho\_f u))/\partial t + \rho\_f (u - u\_m)\nabla \cdot u - \mu(\nabla((\nabla u + (\nabla u)^T) + \nabla \cdot p - \rho\_0 g \beta\_T(T - T\_0) = 0 \quad (2)$$

where t is the time, ρ_f is the fluid's density, u is the velocity vector, um is the mesh velocity due to the movement of the coordinate system, μ is the viscosity of the fluid, p is the fluid pressure, $\rho\_0$ is the reference density, g is the gravitational acceleration vector, $\beta\_T$ is the thermal expansion coefficient of the fluid, T is the temperature, T0 is the reference temperature, and ∇ is the differential operator with respect to the Eulerian coordinate.

The structural deformations of the Ecoflex 30 were solved using a two-parameter incompressible Mooney-Rivlin material model. The governing equation for the solid can be described by the following equation:

$$\nabla\sigma + F\_s = \rho\_s(\partial^2 d\_s)/(\partial t^2) \quad (4)$$

$$P = 2(1-\lambda^{(-3)})(\lambda c\_10 + c\_01) \quad (5)$$

where $\rho\_s$ is the solid density, σ is the Cauchy stress tensor, $F\_s$ is the body force per unit volume, $d\_s$ is the displacement of the solid, P is the first Piola-Kirchhoff stress tensor, $c\_10$ and $c\_01$ are Mooney-Rivlin material parameters, and λ is the value of the principal stretches. The wall between the solid and fluid experienced a load from the fluid, given by:

$$F\_T = -n(-pI + \mu(\nabla u + [(\nabla u)]^T)) \quad (6)$$

where n is the normal vector to the boundary, and I is the identity tensor. This load represents a sum of pressure and viscous forces. The wall was assumed to be isotropic, linear, and nearly incompressible. A uniform flow was assigned at the inlet and a pressure boundary was assigned at the outlet. For the solid structural components, the boundary conditions included fixed displacements at the inlet, and free displacement of the wall.

Sensor Application

To collect the temperature and light information of the ocean, the temperature and light sensors were embedded in the new jellyfish shown in FIG. 8a. Sensor data collected while ocean testing was specifically chosen to monitor the environmental conditions that coral needs to thrive in such as temperature, depth, and light intensity. To test the onboard temperature sensor, a test was conducted to check the response of the system and how it will measure large differences in temperature. Both versions (viz., the Delrin pressure vessel and aluminum pressure vessel; see FIG. 8c(ii)) of the soft robotic jellyfish apparatus 20 underwent the test, to check any differences that the change of pressure vessel material could have had on the temperature response of the system. The test consists of placing the vehicle in a room temperature body of water for 15 minutes and then placing the vehicle directly into a bath of ice water. The results from FIG. 8c(ii) shows that the aluminum pressure vessel system had a faster temperature response time than that of the Delrin pressure vessel; all data from the test can be seen in the figure below. FIG. 8e(ii) shows all three colored light intensities measured by the light sensor. After initial testing, it was discovered that the light sensor chosen for this vehicle could not operate effectively in shallow depths due to the maximum intensity the can measure. The blue and green light intensities saturate at 10000 μW/cm2 for a significant portion of the test, so only the red-light intensity can be utilized. The green and blue light intensities can be utilized at deeper depths.

The battery test was programmed to shut off once any one of the three cells dropped below 3 volts. Under these conditions, the vehicle was capable of running for approximately 3.5 hours. The results of the battery life test can be seen in FIG. 8d(ii).

Conclusion

The soft robotic jellyfish apparatus 20 was designed, assembled, and tested with increased sensing capabilities as well as omnidirectional travel. This new jellyfish iteration is used as a low frequency, low power sensing application like the model before it. The ability to closely monitor the health of a delicate ecosystem, such as a coral reef, is a pivotal and challenging task. By using soft robotics, a small vehicle could safely operate near a very fragile coral collecting invaluable marine data. The use of a novel, efficient swimming monitoring system can change how delicate and sensitive ecosystems are monitored. The current low powered marine monitoring systems are primarily stationary buoys, towed scanning devices, and satellite imaging. The use of biomimicry also allows for the potential of furtive area surveillance and monitoring along any coastal region.

Methods

Vehicle Control

The initial controller for the vehicle was a simple bang-bang controller, which had two pump modes on and off. When the pressure sensor measured the vehicle's depth to be above the target depth, it would turn off all pumps and begin to sink. When the pressure measured was below the target depth, the pumps would be activated at a constant frequency of 0.3 Hz. While this controller was capable of maintaining depth, it would cause the vehicle to oscillate about the target depth; an improved controller could be implemented.

The vehicle's position feedback loop was based on the sensor data collected from the pressure sensor located at the bottom of the jellyfish. The sensor fed raw data into the teensy microcontroller with which it measures the depth of the vehicle (Δ) and then compared it to the desired depth Δd. The error of the system was defined by the difference between Δd and the current position of the vehicle. Once the error had been calculated, the Teensy then related the error to the pump off time to control the frequency of actuation. It was utilizing the thrust force test data seen in FIGS. 3a-3c, the pump off time was characterized by the best fit line calculated by the frequency range of 0 Hz to 0.3 Hz and an error range of 0 to 25 cm. When the vehicle was below the specific error range, the actuation saturated at 0.3 Hz, which generated the most upward thrust. When the vehicle was operating above Δd, the pump off time was dictated by an adjusted version of the best fit line from the thrust force tests.

When the vehicle was above the target depth, it would sink until it reaches Δd. But an uncontrolled descent could cause overshoot of the desired depth, so the vehicle actuated as it sank to slow the jellyfish down as it approaches Δd. Just like the below Δd operation, the above Δd operation calculated the error and altered the frequency of actuation according to the distance from the desired depth.

Bang-Bang Controller $$e = \Delta d - \Delta \quad (1)$$

$$t_{on} = 600 \text{ ms}, t_{off} = 2733 \text{ ms, when } e < 0 \quad (2)$$

$$t_{on} = 0 \text{ ms, when } e > 0 \quad (3)$$

Where e is the error of the system in cm, $t_{on}$ is the time the pumps 34-38 are on in milliseconds, and $t_{off}$ is the time the pumps 34-38 are off in milliseconds. FIGS. 3a-3c showed the duty cycle of the pumps 34-38 for the bang-bang controller. The frequency of actuation was dictated by the off-time. To achieve a full stroke of the actuators, the pumps must be on for 600 ms.

The adaptive bioinspired controller relationship between frequency and error could be seen in the FIGS. 3a-3c. The closer the vehicle was to the desired threshold, the smaller the actuation frequency became; therefore, the least amount of thrust force was generated.

Adaptive Bioinspired Controller $$t_{on}=600 \text{ ms}, t_{off}=f(e), \text{ when } 0<e<\infty \quad (4)$$

$$f(e)=-111083e^3+142825e^2-67927e+14866 \quad (5)$$

$$t_{on}=600 \text{ ms}, t_{off}=f(e), \text{ when } 0>e>-\infty \quad (6)$$

$$f(e)=111083e^3+142825e^2+67927e+14866 \quad (7)$$

In FIGS. 3a-3c, the duty cycle of pump actuation was shown where the constant on-time was 600 ms, and the frequency of time was driven by the error measured by the Teensy.

Load Cell Testing

The in-line load cell test was performed in a wave tank. The wave tank was chosen for this test because of its depth. The jellyfish was able to be submerged deep enough to avoid surface effects as well as bottom effects. A Futek 21b.JR S-Beam load cell was used for this test and was powered by a BK Precision 1672 Triple Output DC Power Supply set at 10V. The load cell was calibrated with a certified weight set before the tests to ensure accurate data was received. The load cell signal output was loaded into Simulink using a National Instruments BNC-2090A Data Acquisition board for real-time data acquisition.

The mounting system used for the in-line load cell test was a roughly 2.5-inch diameter plexiglass circle and a 3D printed component with ¼-28 thread, which was tap affixed to a spare pressure vessel cap. The 3D printed part would thread over a ¼-28 threaded shaft, which would thread into an aluminum adaptor. The aluminum adaptor would thread into the bottom of the load cell, and the top of the load cell would be attached to an aluminum plate that ran the width of the wave tank. The apparatus 20 was able to communicate wirelessly while being submerged in the wave tank during the load cell test. Due to wireless communication, it was possible to run the different load cell tests without having to remove the jellyfish from the setup. Being able to run all the criteria under the exact same condition gave a consistent baseline and removed the risk for potentially skewed data. Twenty-two tests were run, all varying in either frequency or stroke length of actuation.

Free Swimming Testing

The free-swimming tests were done in three different environments and were comprised of multiple actuation schemes to provide qualitative results of the vehicle's movement capabilities. The three environments were 1-2-foot-deep wave tank/aquarium, 10-foot-deep pool, and ocean sites. Each of these environments tested the soft robotic jellyfish apparatus 20's capabilities in different ways and was critical in proving the movement-related hypotheses. The two styles of free-swimming tests were uniform actuation in were all three sets of actuators are engaged and disengaged synchronously and uniformly. This style of test demonstrates the vehicle's ability for upward movement. The other style of the experiment was the uniform actuation of a single or two sets of actuators. The use of single or double actuation schemes demonstrates the horizontal motion capabilities of the vehicle. These free-swimming tests were recorded and analyzed for qualitative results.

Aquarium Testing

Wave tank and aquarium testing were done as the first stage of free-swimming testing and gave early insight into what actuation styles and frequencies would yield the best results. Upward swim speeds were characterized visually using open-source motion tracking software called Kinovea, to time how fast the vehicle traveled a known distance. But due to the relatively small size of these environments, the free-swimming tests were limited to upward travel. Additionally, light, depth, and temperature sensor data were collected in the tank environment at the varying depths of the upward swim tests.

Pool Testing

The pool testing was done following wave tank and aquarium testing and gave the vehicle a much larger area to operate in. The pool was the first testing environment that allowed for effective operation with the depth sensor. The pool was also the first testing environment that the light sensor could be effectively operated, showing different readings based on varying depths. By setting up a grid out of line at the bottom of the pool, the horizontal motion of the vehicle could be tracked and measured. All velocities calculated from pool tests were recorded, and horizontal and vertical speeds were calculated using Kinovea. The depth controllers were tested in the pool environment as well, a target depth was set, and multiple trials were conducted for each controller to gauge performance and compare which controller more effectively held the desired depth. The vertical swimming metrics were conducted and analyzed in the same manner as the lateral swimming tests.

Ocean Testing

Ocean testing was the final environment to test the soft robotic jellyfish apparatus 20 capabilities and show real-world application for the vehicle. The ocean test presented an uncontrolled environment for the vehicle to operate in as well as replicate the conditions it would typically be operating under. There was multiple ocean test conducted at several different locations, including the SS Copenhagen wreck of the coast of Fort Lauderdale and the EuroJax off the coast of Dania beach. The SS Copenhagen test was roughly 35 feet deep and was conducted along approximately 100 yards of the artificial reef. The EuroJax test site was the shallowest ocean test conducted at around 20 feet.

REFERENCES

1. Salm R V, Salm R V, Clark J R, et al. Marine and coastal protected areas: a guide for planners and managers. IUCN; 2000.
2. Beatley T, Brower D, Schwab A K. An introduction to coastal zone management. Island Press; 2002.
3. Moberg F, Folke C. Ecological goods and services of coral reef ecosystems. Ecological economics. 1999; 29(2):215-33.
4. Schoepf V, Stat M, Falter J L, et al. Limits to the thermal tolerance of corals adapted to a highly fluctuating, naturally extreme temperature environment. Scientific reports. 2015; 5(1):1-14.
5. Scavia D, Field J C, Boesch D F, et al. Climate change impacts on US coastal and marine ecosystems. Estuaries. 2002; 25(2):149-64.
6. Jokiel P L, Brown E K, Friedlander A, et al. Hawai'i coral reef assessment and monitoring program: spatial patterns and temporal dynamics in reef coral communities. Pacific Science. 2004; 58(2):159-74.
7. Suzuki T, Kato K, Makihara E, et al. Development of underwater monitoring wireless sensor network to support coral reef observation. International Journal of Distributed sensor networks. 2014; 10(4):189643.
8. Felemban E, Shaikh F K, Qureshi U M, et al. Underwater sensor network applications: A comprehensive survey. International Journal of Distributed Sensor Networks. 2015; 11(11):896832.
9. Kawabata K, Takemura F, Suzuki T, et al. Underwater image gathering by utilizing stationary and movable sensor nodes: towards observation of symbiosis system in the coral reef of Okinawa. International Journal of Distributed Sensor Networks. 2014; 10(7):835642.
10. Sfakiotakis M, Lane D M, Davies J B C. Review of fish swimming modes for aquatic locomotion. IEEE Journal of oceanic engineering. 1999; 24(2):237-52.
11. Salazar R, Campos A, Fuentes V, et al. A review on the modeling, materials, and actuators of aquatic unmanned vehicles. Ocean Engineering. 2019; 172:257-85.
12. Zhou C, Low K. Design and locomotion control of a biomimetic underwater vehicle with fin propulsion. IEEE/ASME Transactions on Mechatronics. 2011; 17(1):25-35.
13. Dudek G, Jenkin M, Prahacs C, et al. A visually guided swimming robot. 2005 IEEE/RSJ International Conference on Intelligent Robots and Systems. IEEE; 2005; 3604-9.
14. Katzschmann R K, DelPreto J, MacCurdy R, et al. Exploration of underwater life with an acoustically controlled soft robotic fish. Science Robotics. 2018; 3(16): eaar3449.
15. Suzumori K, Endo S, Kanda T, et al. A bending pneumatic rubber actuator realizing soft-bodied manta swimming robot. Proceedings 2007 IEEE International Conference on Robotics and Automation. IEEE; 2007; 4975-80.
16. Niu C, Zhang L, Bi S, et al. Development and depth control of a robotic fish mimicking cownose ray. 2012 IEEE International Conference on Robotics and Biomimetics (ROBIO). IEEE; 2012; 814-8.
17. Guo S, Ge Y, Li L, et al. Underwater swimming micro robot using IPMC actuator. 2006 International Conference on Mechatronics and Automation. IEEE; 2006; 249-54.
18. Neveln I D, Bai Y, Snyder J B, et al. Biomimetic and bio-inspired robotics in electric fish research. Journal of experimental Biology. 2013; 216(13):2501-14.
19. Behbahani S B, Tan X. Bio-inspired flexible joints with passive feathering for robotic fish pectoral fins. Bioinspiration & biomimetics. 2016; 11(3):036009.
20. Xu N W, Dabiri J O. Low-power microelectronics embedded in live jellyfish enhance propulsion. Science Advances. 2020; 6(5):eaaz3194.
21. Villanueva A, Smith C, Priya S. A biomimetic robotic jellyfish (Robojelly) actuated by shape memory alloy composite actuators. Bioinspiration & biomimetics. 2011; 6(3):036004.
22. Hoover A P, Griffith B E, Miller L A. Quantifying performance in the medusan mechanospace with an actively swimming three-dimensional jellyfish model. Journal of Fluid Mechanics. 2017; 813:1112-55.
23. Bressers S, Chung S, Villanueva A, et al. JetSum: SMA actuator based undersea unmanned vehicle inspired by jellyfish bio-mechanics. Behavior and Mechanics of Multifunctional Materials and Composites 2010. International Society for Optics and Photonics; 2010; 76440G.
24. Ye X F, Hu Y N, Guo S X, et al. Driving mechanism of a new jellyfish-like microrobot. 2008 IEEE International Conference on Mechatronics and Automation. IEEE; 2008; 563-8.
25. Guo S, Shi L, Asaka K. IPMC actuator-based an underwater microrobot with 8 legs. 2008 IEEE International Conference on Mechatronics and Automation. IEEE; 2008; 551-6.
26. Najem J, Akle B, Sarles S A, et al. Design and development of a biomimetic jellyfish robot that features ionic polymer metal composites actuators. ASME 2011 Conference on Smart Materials, Adaptive Structures and Intelligent Systems. American Society of Mechanical Engineers Digital Collection; 2011; 691-8.
27. Nawroth J C, Lee H, Feinberg A W, et al. A tissue-engineered jellyfish with biomimetic propulsion. Nature biotechnology. 2012; 30(8):792-7.
28. McHenry M J, Jed J. The ontogenetic scaling of hydrodynamics and swimming performance in jellyfish (*Aurelia aurita*). Journal of Experimental Biology. 2003; 206 (22):4125-37.
29. Lucas C H. Reproduction and life history strategies of the common jellyfish, *Aurelia aurita*, in relation to its ambient environment. Jellyfish Blooms: Ecological and Societal Importance. Springer; 2001. p. 229-46.
30. Marut K, Stewart C, Michael T, et al. A jellyfish-inspired jet propulsion robot actuated by an iris mechanism. Smart Materials and Structures. 2013; 22(9):094021.
31. Weston J, Colin S P, Costello J H, et al. Changing form and function during development in rowing hydromedusae. Marine Ecology Progress Series. 2009; 374:127-34.
32. Hu H H, Patankar N A, Zhu M. Direct numerical simulations of fluid-solid systems using the arbitrary Lagrangian-Eulerian technique. Journal of Computational Physics. 2001; 169(2):427-62.
33. Gao T, Hu H H. Deformation of elastic particles in viscous shear flow. Journal of Computational Physics. 2009; 228(6): 2132-51.
34. Lin Z, Hess A, Yu Z, et al. A fluid-structure interaction study of soft robotic swimmer using a fictitious domain/active-strain method. Journal of Computational Physics. 2019; 376:1138-55.
35. Hess A M. Simulation and Design of Soft Robotic Swimmers with Artificial Muscle: Michigan State University; 2019.
36. Lighthill M. Note on the swimming of slender fish. Journal of fluid Mechanics. 1960; 9(2):305-17.
37. Purcell E M. Life at low Reynolds number. American journal of physics. 1977; 45(1):3-11.
38. Frame J, Lopez N, Curet O, et al. Thrust force characterization of free-swimming soft robotic jellyfish. Bioinspiration & biomimetics. 2018; 13(6):064001.

While the invention has been described in detail and with reference to specific examples thereof, it will be apparent to one skilled in the art that various changes and modifications can be made therein without departing from the spirit and scope thereof.

What is claimed is:

1. An underwater robot apparatus that can freely swim in three dimensions for monitoring underwater marine life in a marine environment, said apparatus comprising:
   a body portion having a plurality of soft actuators that can articulate to maneuver and propel said apparatus;
   a plurality of submersible pumps within said body portion, each one of said plurality of submersible pumps controlling the activation of particular ones of said plurality of soft actuators;
   a pressure sensor for detecting the pressure of the ambient marine environment corresponding to depth in the marine environment;

an adaptive controller coupled to each one of said submersible pumps for commanding said plurality of submersible pumps to undulate said particular ones of said plurality of soft actuators at an undulation frequency, wherein said pressure sensor coupled to said adaptive controller for providing feedback to form a depth tracking error defined by the difference between a target depth and a current depth of the underwater robot apparatus, and wherein said adaptive controller modulates the undulation frequency based on said depth tracking error to move the apparatus toward the target depth via omnidirectional movement of said apparatus within said marine environment.

2. The underwater robot apparatus of claim 1 wherein plurality of soft actuators comprise nine soft actuating members that arranged radially around said body portion, each of said actuating members having a first end formed into a ring that situates around said body portion and a second end that is free to articulate.

3. The underwater robot apparatus of claim 2 wherein said plurality of submersible pumps comprises three submersible pumps, each submersible pump controlling three soft actuating members.

4. The underwater robot apparatus of claim 1 further comprising a temperature sensor for detecting the temperature of the ambient marine environment.

5. The underwater robot apparatus of claim 1 further comprising a light sensor for detecting distinct colors in said marine environment.

6. The underwater robot apparatus of claim 5 further comprising a radio frequency (RF) module, said RF module permitting the communication of between said apparatus and a remote transceiver.

7. The underwater robot apparatus of claim 1 wherein said adaptive controller commands said plurality of submersible pumps to activate said plurality of soft actuating members in a cyclic manner and adjusts said undulation to cause said apparatus to maneuver in three dimensions.

8. The underwater robot apparatus of claim 3 wherein said adaptive controller commands cyclic flow of said three submersible pumps which adjusts a relative amount of ambient sea water pumped into each side of said actuating member for generating an upside down motion, rotation or for effecting vertical or horizontal swimming.

9. The underwater robot apparatus of claim 1 wherein said adaptive controller can maintain said apparatus swimming at a desired depth within the marine environment.

10. The underwater robot apparatus of claim 1 wherein the marine environment is dark and wherein said at least one of said plurality of soft actuators comprises a phosphorescent, luminescent or glowing material within at least one of said soft actuators for illuminating the dark marine environment.

11. A method for forming an underwater robot apparatus that can freely swim in three dimensions for monitoring underwater marine life in a marine environment, said method comprising:
providing a body portion having a plurality of soft actuators that can articulate to maneuver and propel said apparatus;
coupling a plurality of submersible pumps to respective ones of said plurality of soft actuators, such that each of one of said submersible pumps activates said respective ones of said plurality of soft actuators;
coupling an adaptive controller to each one of said submersible pumps for commanding said plurality of submersible pumps to undulate said particular ones of said plurality of soft actuators at an undulation frequency; and coupling a pressure sensor to said adaptive controller for detecting the pressure of the ambient marine environment corresponding to depth in the marine environment and providing feedback to said adaptive controller to form a depth tracking error defined by the difference between a target depth and a current depth of the underwater robot apparatus, wherein said adaptive controller modulates the undulation frequency based on said depth tracking error to move the apparatus toward the target depth via omnidirectional movement of said apparatus within said marine environment.

12. The method of claim 11 wherein plurality of soft actuators comprise nine soft actuating members that arranged radially around said body portion, each of said actuating members having a first end formed into a ring that situates around said body portion and a second end that is free to articulate.

13. The method of claim 12 wherein said plurality of submersible pumps comprises three submersible pumps, each submersible pump controlling three soft actuating members.

14. The method of claim 11 further comprising the step of coupling a temperature sensor to said adaptive controller for detecting the temperature of the ambient marine environment.

15. The method of claim 11 further comprising the step of coupling a light sensor to said adaptive controller for detecting distinct colors in said marine environment.

16. The method of claim 11 further comprising the step of coupling a radio frequency (RF) module to said adaptive controller, said RF module permitting the communication of between said apparatus and a remote transceiver.

17. The method of claim 11 wherein said adaptive controller commands said plurality of submersible pumps to activate said plurality of soft actuating members in a cyclic manner and adjusts said undulation to cause said apparatus to maneuver in three dimensions.

18. The method of claim 13 wherein said adaptive controller commands causes cyclic flow of said three submersible pumps which adjusts a relative amount of ambient sea water pumped into each side of said actuating member for generating an upside-down motion, rotation or for effecting vertical or horizontal swimming.

19. The method of claim 11 wherein said adaptive controller can maintain said apparatus swimming at a desired depth within the marine environment.

20. The method of claim 11 wherein the marine environment is dark and said method further comprising the step of including a phosphorescent, luminescent or glowing material within at least one of said soft actuators for illuminating the dark marine environment.

21. A robotic apparatus that can maneuver or assume different postures in a dark underwater marine environment, said apparatus comprising:
a body portion having at least one soft actuator that can articulate to pose, or maneuver or propel said apparatus, said at least one soft actuator comprising a phosphorescent, luminescent or glowing material which can illuminate the dark underwater marine environment following exposure of said phosphorescent, luminescent or glowing material to light;

at least one driver within said body portion, said at least one driver controlling the activation of said at least one soft actuator; and a controller coupled to said at least one driver, wherein said controller determines a target depth of the underwater robot apparatus and is configured to command said at least one driver to undulate said at least one soft actuator to maneuver or propel or pose said apparatus within said marine environment so as to move the apparatus toward the target depth.

* * * * *